(12) United States Patent
Hirota et al.

(10) Patent No.: US 7,072,506 B1
(45) Date of Patent: Jul. 4, 2006

(54) IMAGE PROCESSING APPARATUS IMAGE FORMING APPARATUS AND COLOR IMAGE DETERMINATION METHOD THEREOF

(76) Inventors: Yoshihiko Hirota, c/o Minolta Co., Ltd., Osaka Kokusai Building., 3-13, 2 Chome, Azuchi-Machi, Chuo-Ku, Osaka-Shi, Osaka (JP); Katsuhisa Toyama, c/o Minolta Co., Ltd., Osaka Kokusai Building., 3-13, 2-Chome, Azuchi-Machi, Chuo-Ku, Osaka-Shi, Osaka (JP); Shoji Imaizumi, c/o Minolta Co., Ltd., Osaka Kokusai Building., 3-13, 2-Chome, Azuchi-Machi, Chuo-Ku, Osaka-Shi, Osaka (JP); Hideyuki Hashimoto, c/o Minolta Co., Ltd., Osaka Kokusai Building., 3-13, 2-Chome, Azuchi-Machi, Chuo-Ku, Osaka-Shi, Osaka (JP); Kazuhiro Ishiguro, c/o Minolta Co., Ltd., Osaka Kokusai Building., 3-13, 1-Chome, Azuchi-Machi, Chuo-Ku, Osaka-Shi, Osaka (JP)

( * ) Notice: Subject to any disclaimer, the term of this patent is extended or adjusted under 35 U.S.C. 154(b) by 0 days.

(21) Appl. No.: 09/263,805

(22) Filed: Mar. 8, 1999

(30) Foreign Application Priority Data

Mar. 9, 1998 (JP) ................................. 10-057025
Jan. 12, 1999 (JP) ................................. 11-005120

(51) Int. Cl.
*G06K 9/00* (2006.01)

(52) U.S. Cl. ...................................... 382/162; 358/518

(58) Field of Classification Search ........ 382/162–167; 358/500–538
See application file for complete search history.

(56) References Cited

U.S. PATENT DOCUMENTS

| 5,032,904 | A | | 7/1991 | Murai et al. |
| 5,282,026 | A | * | 1/1994 | Nagata ........................ 358/500 |
| 5,287,204 | A | * | 2/1994 | Koizumi et al. ............. 358/538 |
| 5,296,939 | A | * | 3/1994 | Suzuki ........................ 358/538 |
| 5,748,801 | A | * | 5/1998 | Goto ........................... 382/270 |
| 5,751,854 | A | * | 5/1998 | Saitoh et al. ................ 382/218 |
| 5,786,906 | A | * | 7/1998 | Shishizuka .................. 358/500 |
| 5,973,804 | A | * | 10/1999 | Yamada ...................... 358/538 |
| 6,240,203 | B1 | * | 5/2001 | Kawano et al. ............. 382/164 |

FOREIGN PATENT DOCUMENTS

| JP | 62101179 | | 5/1987 |
| JP | 362256181 A | * | 11/1987 |
| JP | 63107274 | | 5/1988 |
| JP | 05284372 | | 10/1993 |

* cited by examiner

*Primary Examiner*—Jingge Wu
*Assistant Examiner*—Ishrat Sherali

(57) ABSTRACT

The inventive image processing apparatus takes steps of 1) dividing an image to be processed into numerals of blocks; 2) determining whether a block is a color block or not; 3) determining whether the image is a color image or not based on the rate of color blocks to the entire blocks. Thereby, valid color pixel rate can be obtained at blocks belonging to a color region even though an image is almost monochrome but partially colored. Accordingly, the inventive image processing apparatus can appropriately determine whether the image is a color image or not.

7 Claims, 20 Drawing Sheets

FIG.18

IMAGE PROCESSING APPARATUS IMAGE FORMING APPARATUS AND COLOR IMAGE DETERMINATION METHOD THEREOF

This application is based on applications Nos. 10-057025, and 11-005120 filed in Japan, the contents of which are hereby incorporated by reference.

BACKGROUND OF THE INVENTION

1. Field of the Invention

The present invention relates to an image processing apparatus for processing image data in an image processing equipment such as a copying machine. The present invention relates to, in particular, determination as to whether the image is a monochrome or color image.

2. Description of the Related Art

Conventionally, an image forming apparatus for reading a monochrome or color image from an original on which the image is shown and for reproducing the image on a medium such as a printing paper. In the image forming apparatus of this type differs greatly in time required for processing, power consumption and the like, depending on whether or not an image to be reproduced is a monochrome or color image. For that reason, the apparatus switches operation modes depending on whether the image is a monochrome or a color image.

Meanwhile, there are cases where a person who is not familiar with the operation of office automation (or OA) equipment uses the image forming apparatus of this type. It is, therefore, desirable to automatically select an operation mode according to an image on an original. In view of this, the image forming apparatus incorporates an image processing apparatus to determine whether an image read is a monochrome or a color image and performs image forming operation in an operation mode based on the determination result.

The conventional image processing apparatus determines whether an image is a monochrome or color image as follows. It is determined whether every pixel included in an image is a monochrome or a color pixel and the number of pixels determined as color pixels is counted. If the ratio of the number of color pixels thus counted to the number of all pixels included in the image is higher than a predetermined threshold, then it is determined that the image is a color image. If it is determined as a color image, image formation is conducted in a color image mode. If not, image formation is obviously conducted in a monochrome image mode.

That is, an image is not determined as a color image just because at least one color pixel is included in an image. A threshold for determination is set, for the following reasons.

First, there is sometimes a trace of a color on an inherent monochrome image, caused by a person's accidentally touching, for example, a color ball paint pen. In this case, it is preferable to deal with the image as a monochrome image as a whole even if color pixels are included therein more or less.

Second, some monochrome images are printed by superimposing the three primary colors. In that case, if registration accuracy is low, color pixels may appear on a boundary between black and white. It is inappropriate to determine such an image as a color image. Also, it is not a few possibilities that a monochrome pixel itself is erroneously determined as a color pixel at some level of accuracy to determine whether a pixel is a monochrome or a color pixel.

Third, there are cases where a color pixel is included in an image read from a monochrome original depending on the aberration of an optical system for reading images. It is also inappropriate to determine the image as a color image based on the above situation.

The conventional image processing apparatus as stated above basically determines an image based on the ratio of the number of color pixels to that of all of the color pixels in the image. Due to this, the following problems arise.

Even a color image might be determined as a monochrome image, depending on the original. This applies to an image including a signature written in red on a portion of a monochrome letter-based original and an image on which an underline is partially drawn with a color pen on a monochrome letter-based original. Even if a person who copied the image of this type recognizes it as a color image, the ratio of color pixels to all of the pixels is surprisingly low. The result is, the ratio may unlikely reach a threshold.

Nevertheless, it is possible to determine the image of that type as a color image by setting a low threshold. If so setting, however, it is more likely that an image to be dealt with as a monochrome image is determined as a color image, which does not eventually overcome the problem.

SUMMARY OF THE INVENTION

The present invention has been made to solve the problems inherent in the conventional image processing apparatus as stated above. That is, the object of the present invention is to provide an image processing apparatus which can ensure determining a color image as such even if the ratio of color pixels to the entire pixels is low and which does not determine a monochrome image intended to be dealt with as a monochrome image, as a color image, as well as to provide an image forming apparatus using the image processing apparatus and color image determination method thereof.

An image processing apparatus to attain the above object according to the present invention comprises means for dividing an image into a plurality of blocks, block determination means for determining whether or not each divided block is a color block based on a predetermined determination condition, and means for determining whether or not the image is a color image based on the determination result by the block determination means.

This image processing apparatus divides an image into a plurality of blocks, determines whether or not each divided block is a color block based on a predetermined determination condition and determines whether or not the image is a color image based on the determination result for each block.

Preferably, the image processing apparatus according to the present invention includes means for determining whether or not a pixel included in the image is a color pixel and counting means for counting the number of color pixels for each block. In that case, it may be determined whether or not the image is a color image based on the counting result by the counting means.

Specifically, it is determined whether or not the pixels included in the image are color pixels, respectively, the number of color pixels is counted for each block and it is determined whether or not the image is a color image based on the counting result.

More specifically, in order to determine whether an image is a monochrome image or a color image, the image is divided into a plurality of blocks in the first place. The image division methods include, for example, dividing a portrait image of size of 210 mm×297 mm by 6 in the lateral (or minor side) direction and 10 in the lengthwise (or major side) direction into 60 blocks. It is also determined whether pixels included in the image are monochrome or color pixels one by one. The number of pixels determined as color pixels is counted for each block. Thus, the counted number of color pixels for each block is obtained. Based on the result, it is determined whether or not the image is a color image.

According to this image processing apparatus, therefore, it is possible to count the number of color pixels to some extent if color pixels concentrate in a certain block while the color pixels are not so many in number as a whole. This makes it possible to determine the image as a color image. As a result, type of the image can be appropriately determined without relaxing determination conditions. In other words, a color image to be dealt with as such can surely be determined as a color image without fear that an image to be dealt with as a monochrome image is determined as a color image.

Furthermore, the image processing apparatus according to the present invention includes means for determining whether or not each of the divided blocks is a color block, based on the number of color pixels for each block, to thereby determine whether or not the image is a color image based on the determination result for each block. In this case, it is determined whether the divided blocks are color blocks or not, respectively from the number of color pixels for each block. Based on the determination result, it is determined whether or not the image is a color image.

Here, if the ratio of color pixels, that is, the ratio of the number of color pixels to that of entire pixels in the block exceeds the first threshold, the block may be determined as a color block. Owing to this, even if color pixels are not so many in number over the entire image, a certain block, into which color pixels concentrate and has a high color pixel ratio, is determined as a color block.

It is noted that the number of all pixels per block is normally known (although it does not necessarily mean that all blocks have the same number of pixels). Therefore, it is possible to replace the calculation of a color pixel ratio with the counted number of color pixels per block. Namely, if the number of color pixels within a block exceeds the fifth threshold, the block may be determined as a color block.

Moreover, the image processing apparatus according to the present invention includes means for determining whether or not a block is a block having a feature closer to a specified color, to thereby determine the block of such a feature as a color block if the color pixel ratio exceeds the second threshold which is lower than the first threshold.

In this case, it is determined whether or not a block is a specified-color block. A specified-color block means a block which has a feature closer to a specified color among three primary colors than the other two colors. As to a black letter-based original, for example, if a specified color is red, a block on which a red underline or signature is put corresponds to the specified-color block. As for the block which has been determined as a specified-color block, the lower level second threshold is used to determine whether or not the block is a color block. As for the block which has been determined not to be a specified-color block, the higher level first threshold is used to determine whether or not the block is a color block. Therefore, an image including a specified color is more likely determined as a color image than an image including other colors. It is noted, here, that this method is applicable to a case where type of block is determined based on the counted number of the color pixels.

To determine whether a block is a specified-color block or not, intensity histograms of the three primary colors for each pixel included in a target block may be created, respectively.

The determination method based on the above is as follows. A predetermined intensity range is pre-set for the intensity histogram for each color. The intensity ranges are set such that a specified color (the first intensity range) is higher in intensity than the other two colors (the second intensity range). Only if intensity distributions in the intensity histograms for all of the three primary colors fall within their corresponding intensity ranges, the target block is determined as a specified-color block. If the intensity distribution for at least one of the three colors does not fall within its corresponding intensity range, it is determined that the block is not a specified-color block.

On the basis of the above, if red is a specified color, for instance, color determination is made preferentially to red color in the following manner. As for a block of a black letter-based original on which a red underline is drawn, the color of the block is closer to red than to green and blue. As a result, intensity distributions for all of the three primary colors fall within the above-stated corresponding intensity ranges. Due to this, the block is recognized as a specified-color block and the lower level second threshold is used to determine whether or not the block is a color block. The block tends to be determined as a color block, accordingly.

If the underline is drawn in another color, two out of the three primary colors do not fall within the corresponding intensity ranges. As a result, the block is recognized as a non-specified-color block and the higher level first threshold is used to determine whether or not the block is a color block. The block tends to be determined as a monochrome block, accordingly.

In a block including a color picture, all of the three colors are vivid and intensity distributions for green and blue are shifted upward in respect of the intensity ranges stated above, respectively. Due to this, the block is recognized as a non-specified-color block and the higher level first threshold is used to determine whether or not the block is a color block. As a result, as long as the picture does not occupy a considerably large area, the block is not determined as a color block.

In a block in which red on the back face of a black letter-based original is slightly seen through, red is far less vivid than a red underline drawn on a black letter-based original. The intensity distribution for red is, therefore, shifted downward with respect to the corresponding intensity range and the block is recognized as a non-specified-color block. Accordingly, the higher level first threshold is used to determine whether or not the block is a color block and the block tends to be determined as a monochrome block. It goes without saying that the specified color should not be limited to red.

An operator may designate a specified color.

In this case, first threshold and second threshold may differ according to the divided block. This is because the probability of erroneously determining a monochrome pixel as a color pixel is not necessarily uniform throughout an image. The same thing is true for thresholds for use in determining type of a block based on the counted number of color pixels.

Specifically, one factor for erroneous determination is the chromatic aberration of an optical system arranged in apparatus for reading an original and acquiring image data. The chromatic aberration is normally higher on the peripheral portion than the central portion of an image. Due to this, blocks on the peripheral portion of the image have a higher background value in a color pixel ratio than the central blocks. The blocks exceed their corresponding thresholds, accordingly. To correct this, it is preferable that higher thresholds are set for blocks farther from the center of the image.

Moreover, an operator may adjust the thresholds.

Alternatively, a predetermined color pixel ratio for a certain block may be set lower than those for other blocks. Some original includes a signature in red or the like in a certain region. It is desirable that blocks corresponding to that region tend to be determined as color blocks.

The region in which a signature is put depends on originals. Therefore, it is preferable that blocks on a certain portion may be designated by an operator.

Further, in the image processing apparatus according to the present invention, if a color block ratio which is the ratio of the number of color blocks to the number of all blocks included in an image, exceeds the sixth threshold, the image may be determined as a color image. In this case, when color/non-color block determination is made for respective blocks, a color block ratio for the overall image is calculated. The color block ratio thus calculated is compared with the sixth threshold. If the color block ratio exceeds the sixth threshold, the image is determined as a color image. If not, the image is determined as a non-color image.

Normally, the number of all blocks included in an image is known, so that the number of color blocks instead of the color block ratio may be compared with the seventh threshold to determine whether or not the image is a color image.

In addition, an operator may adjust the sixth and seventh thresholds described above.

Moreover, as for a block on a certain portion such as where the signature mentioned above is put, the number of color blocks may be counted while a predetermined weight is given. This is because if a block designated as one on a certain portion is a color block, it is considered that an operator recognizes the original as a color original.

Alternatively, if a block on such a certain portion is a color block, the image concerned may be determined as a color image irrespectively of the determination results for the other blocks.

Additionally, if a block having a color pixel ratio exceeding the fourth threshold higher than the first threshold is discovered, the image may be determined as a color image irrespectively of the determination results for the other blocks. In this case, the color pixel ratio for each block is compared with the fourth threshold. If there exists any block whose color pixel ratio exceeds the fourth threshold, the image is determined as a color image. Consequently, even if color pixels are concentrated in a particularly narrow region and the color block ratio is not so high, the image can possibly be determined as a color image. The fourth threshold may differ according to the blocks. Specifically, it is preferable that higher thresholds are set for blocks farther from the center of the image.

Additionally, an operator may adjust the fourth threshold.

This process may be performed using the number of color pixels per se. In that case, if a block having the number of color pixels which exceeds the eighth threshold higher than the fifth threshold is discovered, the image may be determined as a color image. If so, color/non-color block determination is not always required.

The image processing apparatus according to the present invention may include means for summing up the number of color pixels for a block group consisting of a plurality of blocks adjacent to one another, to thereby determine whether or not an image is a color image based on the group processing result. In this case, the numbers of color pixels for blocks are summed up for a group of adjacent blocks. An adjacent block group means four blocks of two in lengthwise direction x two in lateral direction, for example. Under such grouping, all blocks other than those on the peripheral portions belong to four-block groups, respectively. There are some images on which color pixels concentrate into a certain region and the region may spread over adjacent blocks. In the circumstances, it may happen that neither of the blocks is determined as a color block. If using the group processing, an image can possibly be determined as a color image even in the circumstances mentioned above.

The details of group processing will be described. That is, based on the number of color pixels for a block and the number of color pixels for a block group which is the sum of the number of color pixels for the group block typically represented by the block and belonging to the group, it is determined whether or not the block is a color block. Based on the determination result, it is then determined whether or not the image is a color image.

More specifically, if the group color pixel ratio, which is the ratio of the number of color pixels to the number of all pixels in the block group represented by the target block exceeds the ninth threshold, then the block may be determined as a color block.

The ninth threshold in this case may differ according to block groups similar to the case of the first threshold stated above. Specifically, it is preferable that higher ninth thresholds are set for block groups to which blocks farther from the center of the image belong.

Further, an operator may adjust the ninth threshold.

In addition, a threshold higher than the ninth threshold may be set and if a block group having a group color pixel ratio exceeding the threshold is discovered, the image may be determined as a color image irrespectively of the other blocks and block groups. Normally, the number of all pixels per block group is known (although the number of one group does not always equal to those of others). Due to this, the above-stated processing may be performed by comparing the sum of the number of color pixels for block groups with a predetermined threshold.

Moreover, in the image processing apparatus according to the present invention, a specified block may be excluded from the targets of color/non-color image determination. In this case, upon excluding the specified block from the determination targets, it is determined whether or not the image is a color image for the remaining blocks. Alternatively, the apparatus according to the present invention may include means for correcting the counting result of the number of color pixels for a specified block. In the latter case, the number of color pixels per block is corrected for a specified block and then color/non-color image determination is made.

As stated above, the image includes a block which leads to erroneous determination resulting from the factor of the optical system or the like. Owing to this, if such a block is set as a specified block in advance, it is possible to prevent an image intended to be dealt with as a monochrome image from being erroneously determined as a color image.

Hence, the "specified blocks" should include blocks which likely cause erroneous determination. It is, therefore, desirable that end portion blocks in contact with the peripheral portions of an image and those on the image folding portions of an original in the form of a book are included as specified blocks.

Moreover, the image processing apparatus according to the present invention may determine whether or not an image is a color image even if the numbers of color pixels for blocks are not completely counted and may stop counting operation for the yet-to-be counted blocks after the determination is completed.

This is because once conditions for color/non-color image determination are prepared in the course of counting operation, there is no need to count the remaining or yet-to-be counted blocks. This makes it possible to immediately go on to the next steps based on the determination result. The significance of color/non-color image determination by dividing the image into blocks lies in the fact that the image can be dealt with as a color image if the image includes at least a portion which should be dealt with as a color image.

In the image processing apparatus according to the present invention, if the saturation of a pixel exceeds the eleventh threshold, the pixel may be determined as a color pixel. In this case, the pixel is determined by extracting the saturation of the pixel from image data and comparing it with the eleventh threshold which has been prepared in advance. That is, if the saturation exceeds the eleventh threshold, the pixel is determined as a color pixel. If not, the pixel is determined as a non-color pixel. The pixels determined as color pixels are counted into the number of color pixels.

Alternatively, if the saturation of a pixel exceeds the eleventh threshold and the brightness thereof is below the twelfth threshold, then the pixel may be determined as a color pixel. In this case, the pixel is determined by extracting the brightness and saturation of the pixel from image data and comparing them with the eleventh and twelfth thresholds, respectively. In other words, if the brightness is below the twelfth threshold and the saturation is above the eleventh threshold, then the image is determined as a color image. If either of the conditions is not satisfied, the image is determined as a non-color image.

The eleventh and twelfth thresholds stated above may differ according to pixels similar to the case of the aforementioned thresholds. Specifically, it is preferable that higher eleventh thresholds or lower twelfth thresholds are set for the pixels farther from the center of the image. Besides, an operator may adjust those thresholds.

In either case, the twelfth threshold is preferably lower than the brightness of pixels on the base portion. This is because even the base portion may have some extent of brightness in some measure because of, for example, an image on the back face of the original seen through.

The image forming apparatus according to the present invention includes means for inputting an image, the image processing apparatus stated above and printing means for performing color-printing if the image is determined as a color image and performing monochrome-printing if the image is determined as a non-color image. In addition, it is determined whether or not the fetched image is a color image in the manner stated above and the image is printed in a manner according to the determination result.

In this case, the means for inputting an image is an image reader. An image is fetched by means of provisional scanning for color/non-color image determination. That is, after the color/non-color image determination, main scanning is conducted for printing the image.

As is obvious from the above-stated description, the present invention provides an image processing apparatus and the like capable of ensuring that an image, even if it has a low color pixel ratio to the entire image due to localized color regions, can be determined as a color image and capable of preventing an image intended to be dealt with as a monochrome image from being erroneously determined as a color image.

BRIEF DESCRIPTION OF THE DRAWINGS

FIG. 18 is an explanatory view for a case of designating a specified block in a form of document;

DETAILED DESCRIPTION OF THE PREFERRED EMBODIMENTS

Embodiments of the present invention will be described in detail below with reference to the accompanying drawings.

[First Embodiment]

Figure 1:
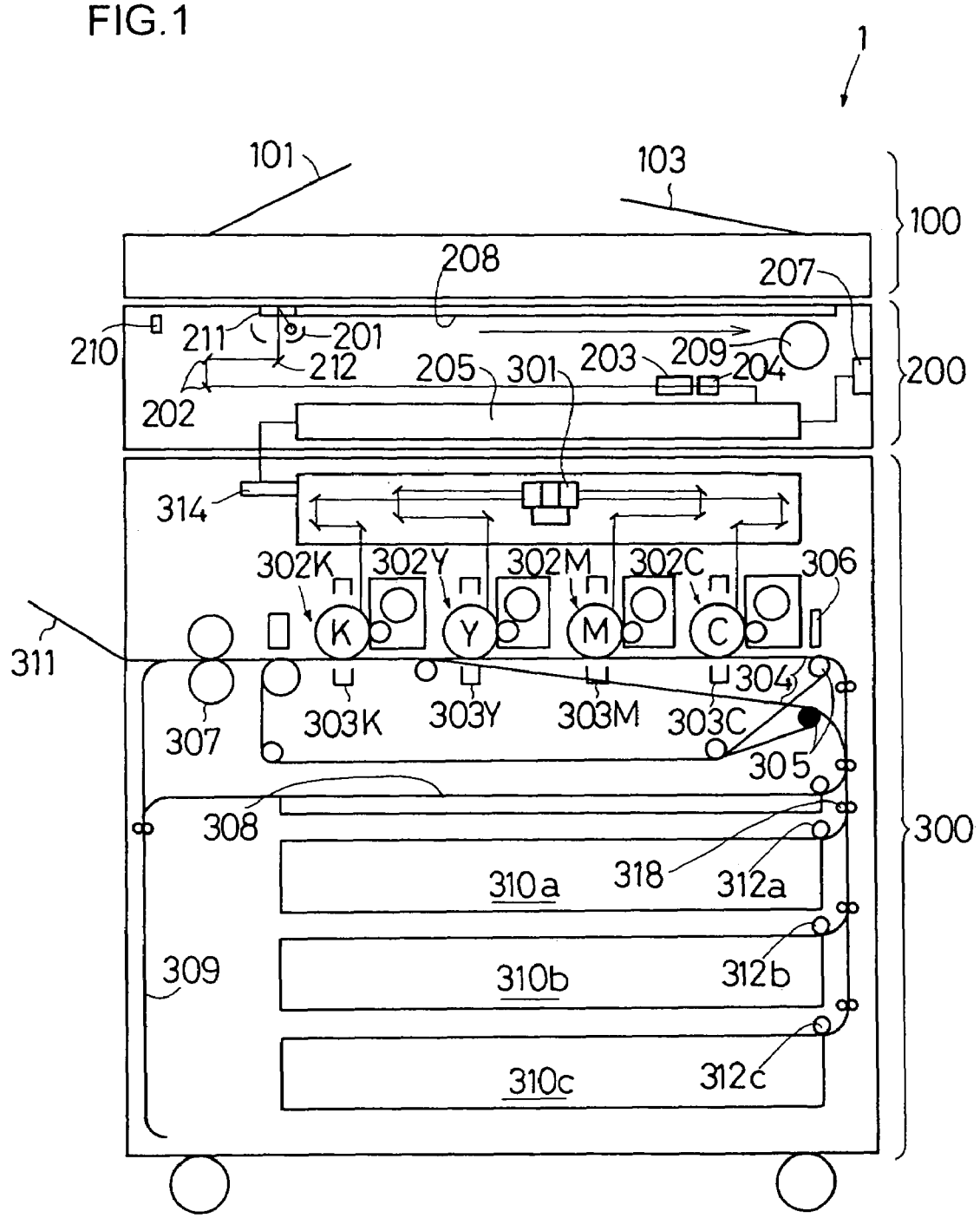
FIG. 1 shows the schematic constitution of a copying machine according to the first embodiment.

This embodiment illustrates that the present invention is applied to a color copying machine having two types of image forming mode, i.e., a monochrome mode and a full-color mode. An apparatus for determining whether an image on an original is a monochrome image or a full-color image is shown. A color copying machine 1 in this embodiment consists of an automated original feeder 100, an image reader 200 and an image forming unit 300 as schematically shown in FIG. 1.

The automated original feeder 100 includes an original set tray 101 and an original ejection tray 103 on an upper surface thereof. The automated original feeder 100 sequentially carries originals placed in the original set tray 101 to a reading position and ejects them to the original ejection tray 103 after reading them.

The image reader 200 includes an original glass plate 208 on an upper surface thereof (right under the automated original feeder 100). Below the plate 208, there are arranged an exposure lamp 201, the first mirror 212, second and third mirrors 202, lens 203 and a CCD sensor 204. Among those devices, the exposure lamp 201 and the first mirror 212 are integral with each other to thereby constitute a scanner movable horizontally in FIG. 1. There is provided with a scanner motor 209 for driving the scanner. The scanner motor 209 is a stepping motor.

A white correction plate 211 for shading correction is provided on one end portion of the original glass plate 208. The image reader 200 is also provided with a scanner home sensor 210 for detecting that the scanner (such as the exposure lamp 201) is in a home position, an image processing apparatus 205 for handling image data and an interface 207 for transmitting and receiving a signal to and from external equipment.

The image forming unit 300 includes a laser oscillator 314 receiving print data from the image processing apparatus 205 in the image reader 200 and emitting a laser beam based on the data, and a polygon mirror 301 for one-dimensional scanning the laser beam.

Below the polygon mirror 301, there are provided four imaging units 302C, 302M, 302Y and 302K corresponding to four colors, i.e., cyan (C), magenta (M), yellow (Y) and black (K), respectively and an endless sheet carrying belt 304 for carrying printing sheets. The sheet carrying belt 304 is supported by a relief roller 305 having movable one portion and functions to switch the full-color mode contacting all of the four imaging units 302C, 302M, 302Y and 302K to/from the monochrome mode contacting only the imaging unit 302K. Below the carrying belt 304, there are provided paper feeding cassettes 310a, 310b and 310c.

A timing sensor 306 and a pair of fixing rollers 307 are provided upstream of the imaging unit 302C in the uppermost stream and downstream of the imaging unit 302K in the lowest stream, respectively. A paper ejection tray 311 is provided in the outer portion of a machine frame in the lower stream of the fixing rollers 307. A double-side unit 308 is provided between the sheet carrying belt 304 and the lower paper feeding cassette 310a and a reverse unit 309 is provided in the left of the paper feeding cassettes 310a, 310b and 310c in FIG. 1.

Next, the operation of the color copying machine 1 will be outlined. If making copies, originals are fed from the original set tray 101 to the original glass plate 208 of the image reader 200 one by one. The originals thus fed are put with copying target sides down and face to the glass plate 208.

In this state, in the image reader 200, the exposure lamp 201 applies light onto the original from the lower direction of the original glass plate 208 and the lamp 201 together with the first mirror 212 scans the original in the rightward direction in FIG. 1. Thus, the light reflecting on the original is incident on the CCD sensor 204 through the second and third mirrors 202 and the lens 203 to thereby obtain image data. When scanning is completed, the original placed on the original glass plate 208 is ejected to the original ejection tray 103.

The image data thus obtained includes intensity signals for respective color components of R (red), G (green) and B (blue) for every pixel. The image data is inputted to the image processing apparatus 205 and subjected to various data processing. Thus, print data is created. Based on the print data, the laser oscillator 314 is driven and a laser beam is one-dimensionally scanned relative to the polygon mirror 301 and applied onto photosensitive drams of the imaging units 302C, 302M, 302Y and 302K in the image forming unit 300. As a result, electrostatic latent images corresponding to the respective colors are formed and developed with corresponding color toners.

Meanwhile, print paper sheets of appropriate size are fed from the paper feeding cassette 310a, 310b or 310c and carried by the sheet carrying belt 304. In the course of carrying paper, toner images of respective colors are transferred and superimposed on one over another. The print paper to which the toner images are transferred is ejected to the paper ejection tray 311 through the fixing rollers 307. It is also possible to make double-sided copies using the reverse unit 309 and the double-side unit 308.

Now, the color copying machine 1 changes over the image forming modes, depending on whether the image on the original is a color image or a monochrome image and makes a copy thereof in an appropriate mode of either the full-color mode or the monochrome mode. To this end, before conducting main scanning to obtain image data for copying the original, provisional scanning is conducted to determine whether the original is a color or monochrome one. The image processing apparatus 205 determines as to whether the original is a color or monochrome one based on provisional scan.

Figure 2:
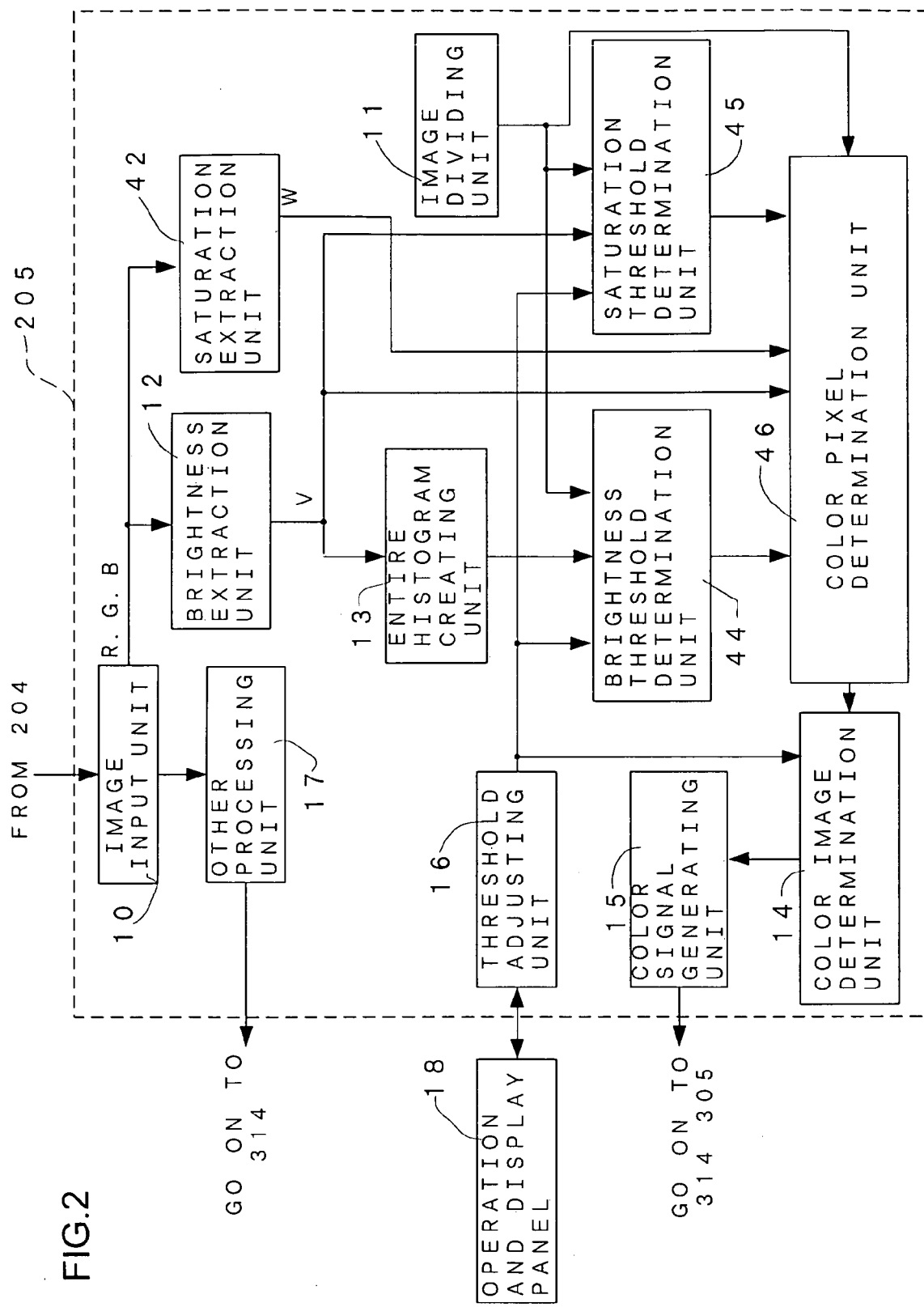
FIG. 2 is a block diagram showing an image processing apparatus in the color copying machine.

Now, the image processing apparatus 205 will be described in detail. The image processing apparatus 205 is a microcomputer incorporating well-known CPU, ROM, RAM and the like and the block diagram thereof is shown in FIG. 2.

Specifically, the image processing apparatus 205 includes an image input unit 10 for inputting image data from the CCD sensor 204, a brightness extraction unit 12 and a saturation extraction unit 42 for extracting brightness components V and saturation components W in response to R, G and B signals from the image data, respectively, an entire image histogram creating unit 13 for creating a histogram for the brightness components V over the entire image, an image dividing unit 11 for dividing the image into a plurality of blocks, a brightness threshold determination unit 44 and a saturation threshold determination unit 45 for determining the thresholds of the brightness components V and the saturation components W for determining the color of the image, a color pixel determination unit 46 for determining pixel colors using the thresholds and the like, a color image determination unit 14 for determining the color of the image based on the result of the color pixel determination unit 46 and a color signal generating unit 15 for generating a color signal if the image is determined as a color image.

Furthermore, the image processing apparatus 205 is provided with a threshold adjusting unit 16 for providing various determination thresholds to the color determination unit 14 and the other processing unit 17 for creating print data and conducting other processing based on the image data. The threshold adjusting unit 16 is connected to an operation and display panel 18.

In the CCD sensor 204, light from an original is separated into R, G and B colors and signals corresponding to the intensity of the respective colors are outputted for each pixel. Thus, R, G and B intensity signals for each pixel are fetched as image data.

Figure 3:
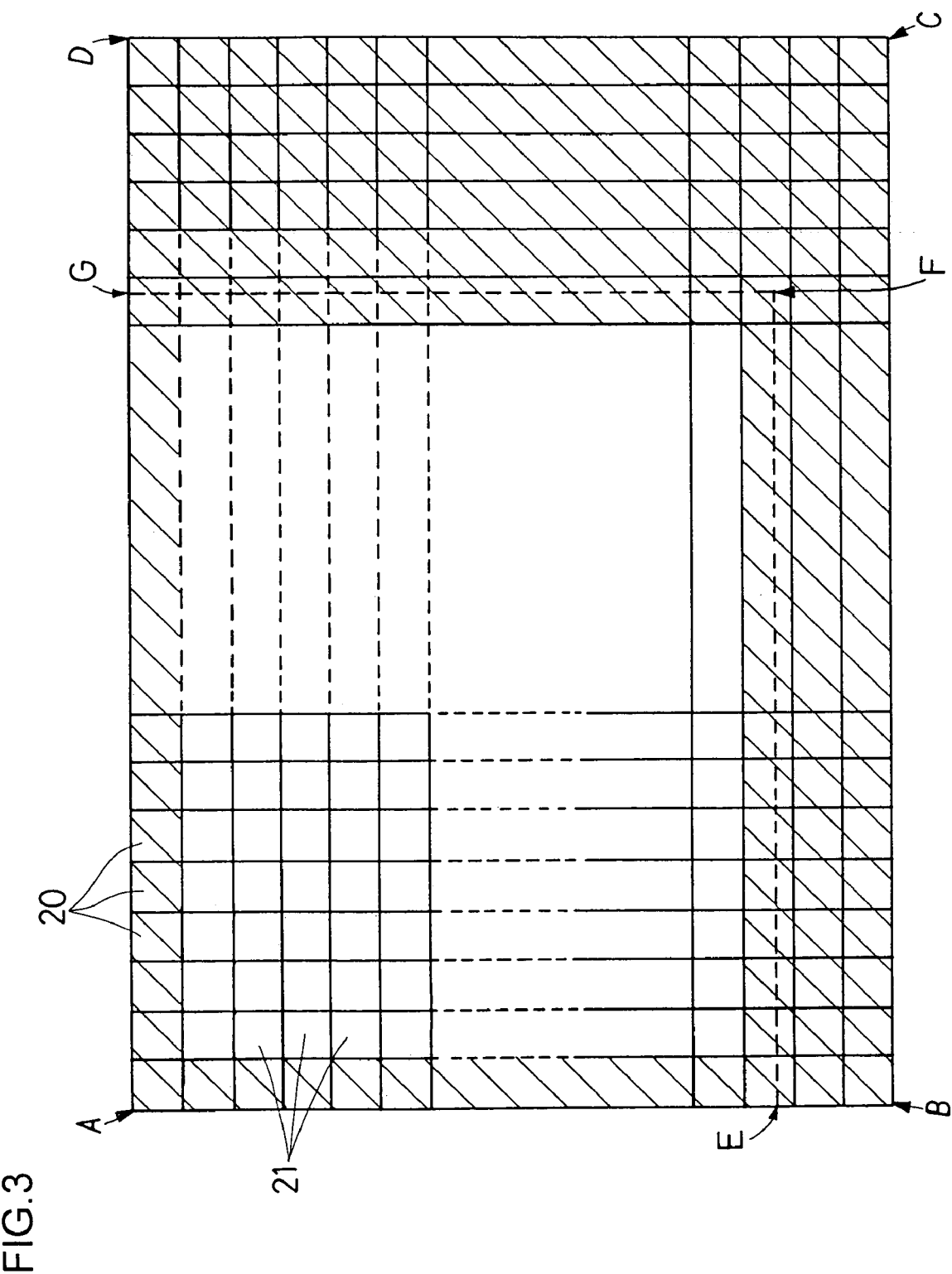
FIG. 3 shows and example of block division in case of a normal original.

The image dividing unit 11 defines how to divide an image into blocks, as shown in FIG. 3, for example. In the example of FIG. 3, a rectangular having corners A, B, C and D indicates the overall surface of the original glass plate 208, whereas a rectangular having A, E, F and G corners indicates the region of an original. The entire plate surface is divided into numerous small regions (blocks). Block numbers are allotted to the divided blocks (except for those which are not subjected to determination), respectively, to identify the blocks.

Figure 4:
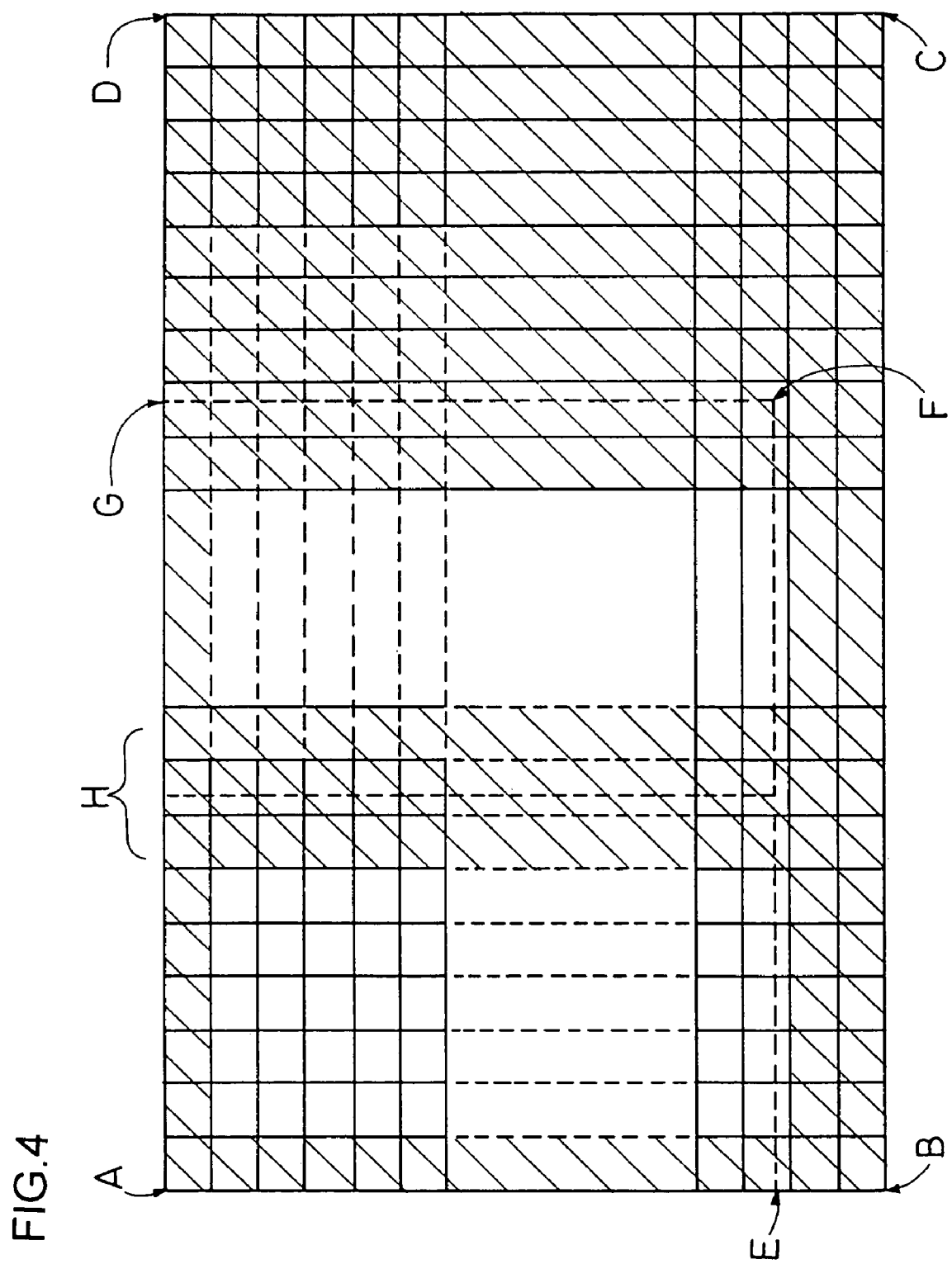
FIG. 4 shows an example of block division in case of a book type original.

The oblique-lined blocks 20 in FIG. 3 are outside of the original region or spanning end portions of the original, which are not subjected to color determination. The remaining blocks 21 are within the range of the original and subjected to color determination. If an original is a book, blocks within a region H corresponding to the folding portion of the book are not subjected to color determination as shown in FIG. 4.

Although the blocks in the region H are actually monochrome, they may include color pixels resulting from an optical system or the like and cause erroneous determination. For that reason, they are not subjected to color determination. Instead of doing so, it is possible to correct image data (or various types of thresholds to be described later) to prevent erroneous determination. The following description is given while those blocks are not subjected to determination.

$$\begin{pmatrix} v \\ Cr \\ Cb \end{pmatrix} = \begin{pmatrix} M_{11} & M_{12} & M_{13} \\ M_{21} & M_{22} & M_{23} \\ M_{31} & M_{32} & M_{33} \end{pmatrix} \begin{pmatrix} R \\ G \\ B \end{pmatrix} \quad (1)$$

The brightness extraction unit 12 and the saturation extraction unit 42 extract brightness components and saturation components for pixels included in the image data, respectively. The extraction of brightness components is conducted based on an expression (1) using a matrix. In the expression (1), R, G and B on the right side indicate signal intensities of the color components for a pixel, respectively. The matrix of 3×3 on the right side is a transform matrix and the factors of the matrix are empirically defined as follows:

$M_{11}=0.3$, $M_{12}=0.6$, $M_{13}=0.1$ $M_{21}=1$, $M_{22}=-0.86$, $M_{23}=-0.14$ $M_{31}=-0.33$, $M_{32}=-0.67$, $M_{33}=1$.

Symbol V on the left side in the expression (1) indicates a brightness signal. Cr and Cb are two types of color difference signals and used for other image processing such as hue correction. The value of the brightness signal V obtained by the expression (1) is very high for white pixel (which are on a blank) and is lower for color pixels and black pixels.

The extraction of saturation components is conducted based on the following expression (2):

$$W = \text{Max}(R, G, B) - \text{Min}(R, G, B) \quad (2).$$

Specifically, the saturation signal W is the difference between the highest intensity signal and the lowest intensity signal of color components of R, G and B. The value of the saturation signal W is 0 for black pixels since all of their color components are 0. The value of saturation signal W is 0 for white pixels since all of their color components equally have the strongest intensity. The value is positive for color pixels since their color components have always significant differences therebetween. Although the saturation signal W obtained based on the expression (2) is not necessarily equal to the hue saturation in a strict sense, it can be easily calculated and sufficiently effective as saturation in practice.

Figure 5:
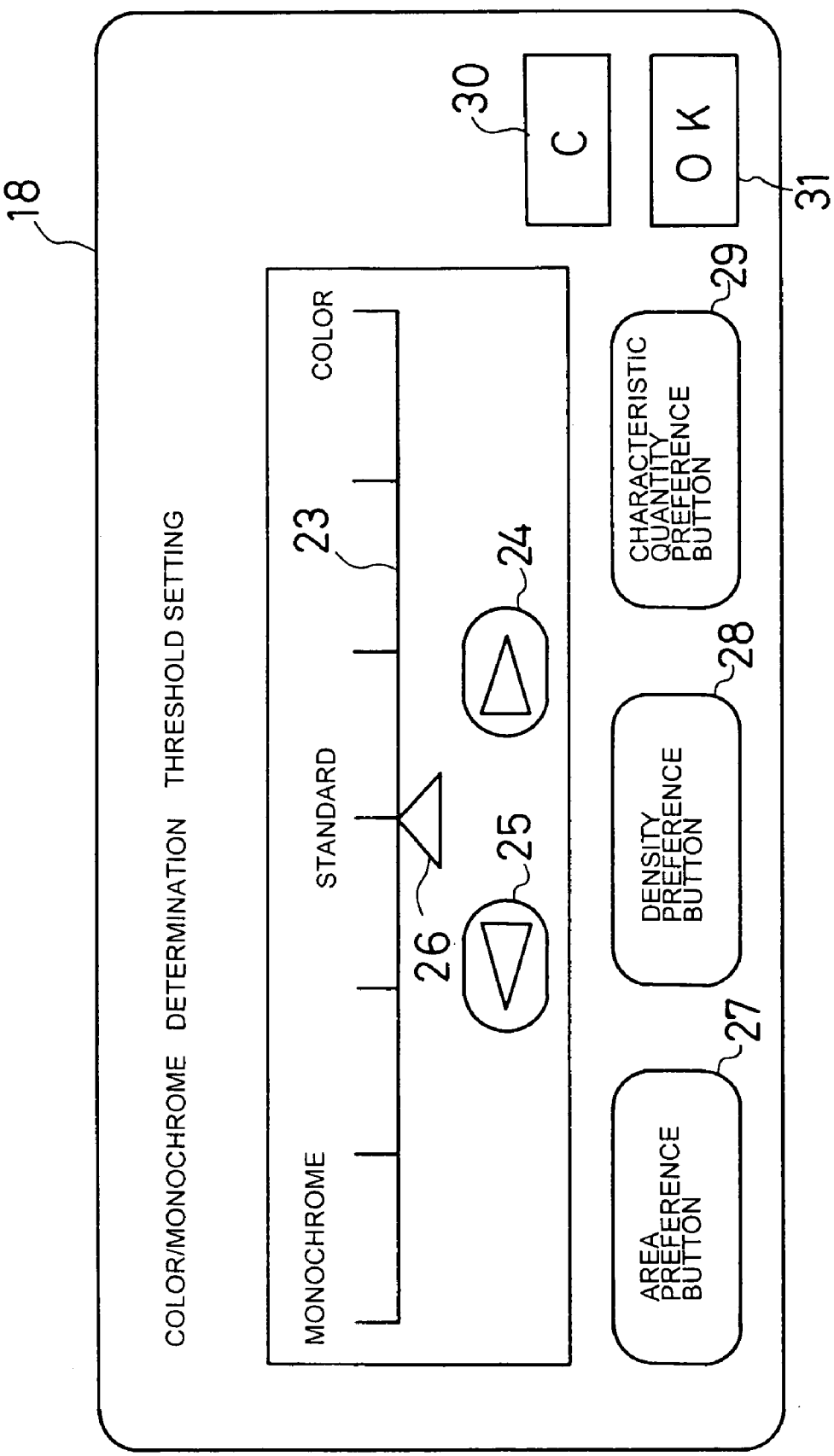
FIG. 5 shows a threshold setting screen on an operation and display panel.

The operation and display panel 18 connected to the threshold adjusting unit 16 can display a threshold adjusting screen as shown in FIG. 5. This screen includes a threshold adjusting bar 23, a cursor 26 of the bar 23, a rightward button 24, a leftward button 25, an area preference button 27, a density preference button 28, a characteristic quantity preference button 29, a clear button 30 and an OK button 31. While this screen is displayed, various thresholds used for the color image determination unit 14 can be adjusted by an operator's operation.

Thresholds adjustable on the panel are three, i.e., a color pixel ratio threshold, a color block ratio threshold and pixel characteristic quantity threshold. The color pixel ratio threshold is used to determine whether a block is a color or monochrome block based on the ratio of color pixels to the all pixels for each block. The color block ratio threshold is used to determine whether an image is a color or monochrome image based on the ratio of the number of color blocks to that of all blocks for every image. The pixel characteristic quantity threshold is used to determine whether or not a pixel is a color pixel based on the result of color analysis to pixel data.

These thresholds are adjusted by pushing the area preference button 27, the density preference button 28 and the characteristic quantity preference button 29 and moving the cursor 26 rightward or leftward with the rightward button 24 and the leftward button 25, respectively. The further leftward the cursor 26 is moved, the more frequently each of the thresholds tends to cause monochrome determination. The further rightward the cursor 26 is moved, the more frequently each of the thresholds tends to cause color determination. Standard values for the respective thresholds are stored in the threshold adjusting unit 16 in advance to thereby allow making determination using a standard value without adjustment operation.

If the operation and display panel 18 is operated as stated above, a command to adjust thresholds issued at the panel 18 is transmitted to the threshold adjusting unit 16. Thus, pixel characteristic quantity thresholds determined by the brightness threshold determination unit 44 and the saturation threshold determination unit 45 as well as color pixel ratio thresholds used in the color image determination unit 14 and color block ratio thresholds can be adjusted. As a result, a brightness threshold Vy, a saturation threshold Wy, a predetermined number Cm(Cmg), a preference threshold Cpr, thresholds Ctr, Cqr and Ctrg used in flow charts shown in FIGS. 6 through 8 to be described later, are adjusted.

Next, color determination processing procedures in the image processing apparatus 205 will be described. As already stated, color determination is made for the image data obtained by provisional scanning conducted prior to main scanning. Main scanning is then conducted to obtain image data of the original to be copied.

The image data obtained by provisional scanning is used to determine whether the image on the original is a color image or a monochrome image, but not used for copying operation in the image forming unit 300. The image data need not have very high resolution. Therefore, provided that a pixel density for main scanning is 400 dpi×400 dpi, the pixel density for provisional scanning may be 400 dpi×100 dpi with scanning speed four times as fast as in main scanning. If provisional scanning is conducted and the resultant image data is inputted into the image input unit 10 of the image processing apparatus 205, then color determination processing starts in accordance with the flow charts shown in FIGS. 6 through 8.

(S1)

In step S1, the first provisional scanning is conducted and color analysis is conducted for each pixel. Specifically, the brightness signal V in the above expression (1) and the saturation signal W in the above expression (2) are obtained. The analysis is conducted in the brightness extraction unit 12 and the saturation extraction unit 42.

(S2)

Figure 9:
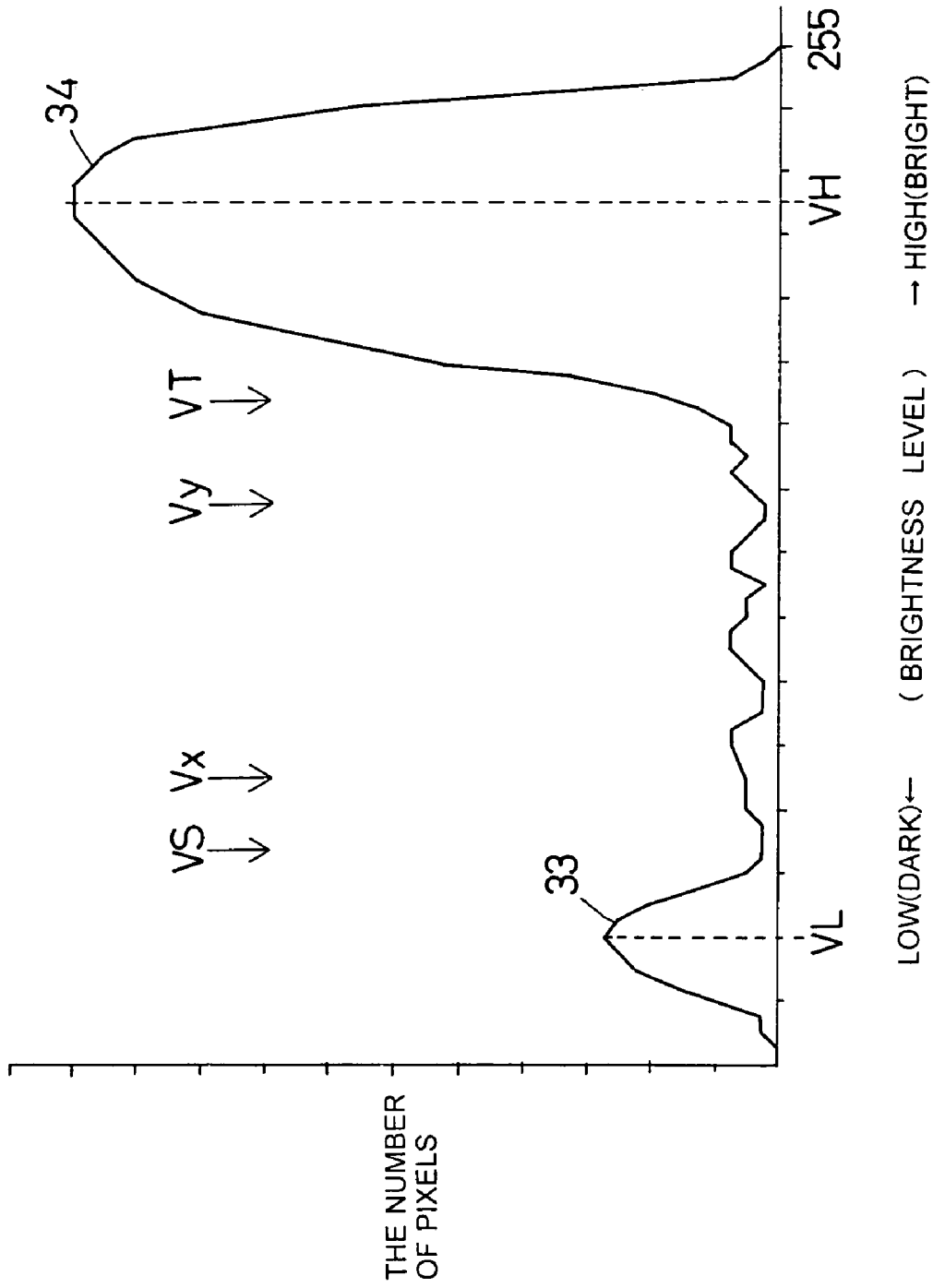
FIG. 9 shows an example of histograms for brightness.

In step S2, the brightness signal W out of the two obtained signals is fed to the entire image histogram creating unit 13, where a histogram for the entire image is crated. An example of the histogram created therein is shown in FIG. 9. In this histogram, the horizontal axis indicates brightness level (256 gradations) and the vertical axis indicates the number of pixels for each level. In FIG. 9, a peak 33 (VL level) in a lower brightness level region and a peak 34 (VH level) in a higher brightness level region are shown. The peak 33 corresponds to pixels existing on the image, whereas the peak 34 corresponds to those on the blank portion.

(S3)

In step S3, a white threshold is determined. The VH level which is the most frequent gradation of the peak 34 indicates the color of the original. The brightness level of the original color slightly differs among the types of the original and may sometimes include colors due to the influence of the seen-through image on the back face of the original and the like.

Considering this, a VT level on the bottom of the peak 34 is read from the histogram of FIG. 9 and set as a white threshold. The VT level is lower than the VH level by degrees of a variation in the brightness signal V per se and the slight color development due to the influence of the seen-through image on the back face. Pixels having a higher brightness level than the white threshold (or VT level) are regarded as those on the blank and dealt with as monochrome pixels in later processing.

It is noted that a default value is prepared for the white threshold in advance. The reason is as follows. If an original subjected to provisional scanning is entirely a color original, it is sometimes impossible to determine the VH level from a histogram. In this case, there is not point in determining a white threshold and processing is proceeded using the default value.

A freely chosen value (such as Vx and Vy) between the white threshold VT level and the VS level on the bottom of the peak 33 is set as a brightness threshold. It is also possible to use a predetermined value prepared in advance as a brightness threshold without effecting the first provisional scanning (processing in the steps S1 and S2).

(S4)

In step S4, the second provisional scanning is conducted, in which the image data is divided into blocks. Specifically, the vertical and horizontal divisions shown in FIG. 3 are defined for the image data and the image data is divided into a plurality of small-region blocks. Each of the blocks includes a lot of pixels. In addition, block numbers starting with 0 are allotted to the blocks, respectively.

As stated in the description of FIG. 3, the blocks 20 contacting with the end portions of the original are not subjected to determination. Needless to say, no block numbers are allotted to the blocks 20. If the original is a book, blocks in the region H corresponding to folding portion of the book are also excluded from the color determination target blocks. If the memory capacity of the processing apparatus is high and the result of the first provisional scanning is stored in the memory, then the second scanning is not required.

(S5)

In step S5, variables are defined. The defined variables are "Nb" for counting the number of blocks which are determined as color blocks and "i" for counting the number of blocks which have been subjected to determination processing while sequentially noting the divided blocks one by one. At this moment, each of the variables are "0".

(S6)

In step S6, the block of number "i" is set as a target block. The block of number 0 is first set as the target block.

(S7)

Figure 10:
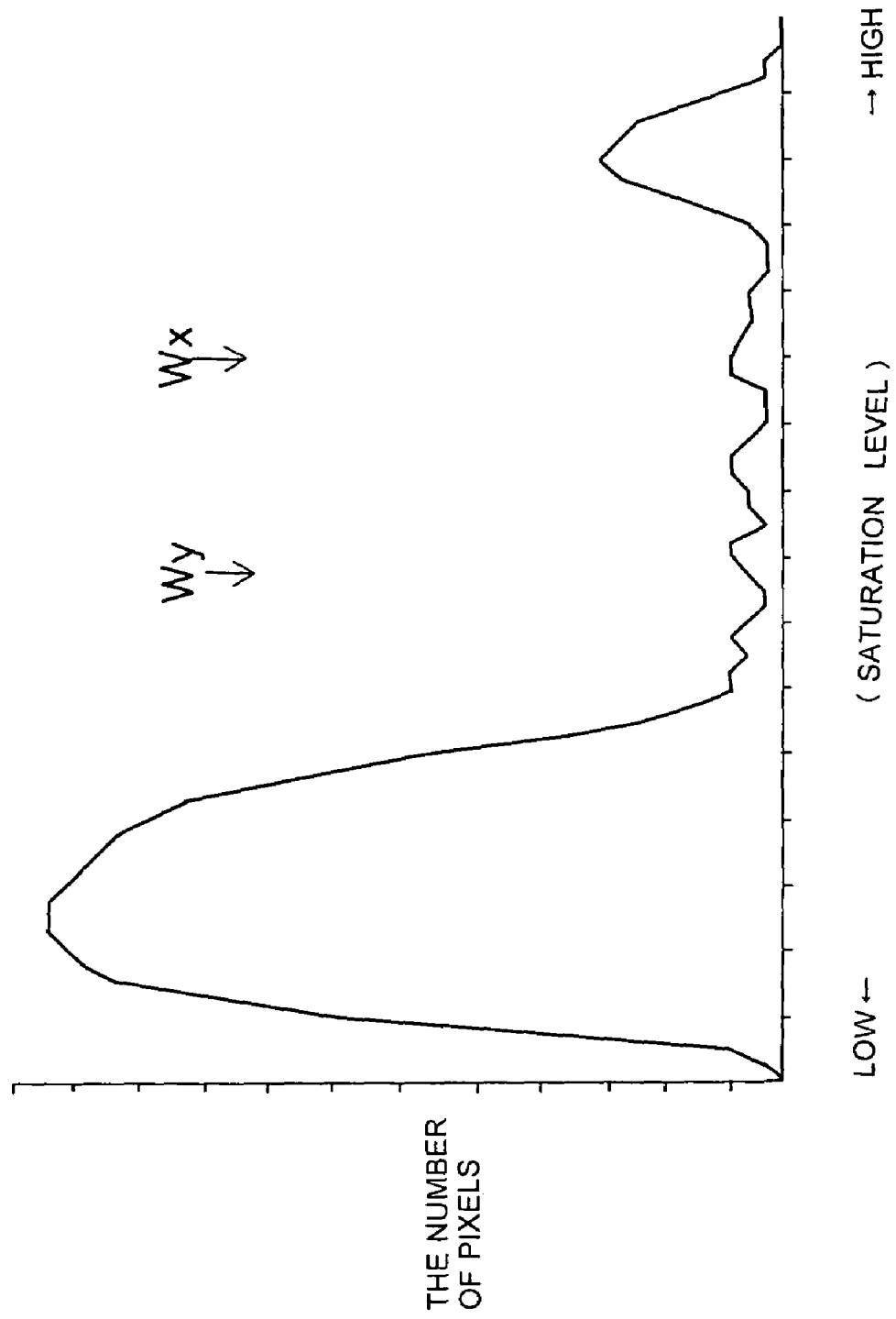
FIG. 10 shows an example of histograms for saturation.

In step S7, histograms for the brightness signal V and the saturation signal W obtained by the second provisional scanning are created for each pixel in the target block. The brightness signal V histogram created here is almost analogous to that shown in FIG. 9 if the image is almost uniform. Meanwhile, the saturation signal W has a shape as shown in FIG. 10 which is almost a turned over the vertical axis from that shown in FIG. 9 like shape if the image consists of, for example, a white blank and a red portion. The counting of the number of color pixels within the blocks may suffice instead of creating histograms for each block.

(S8)

In step S8, the number Cx of pixels having particularly high color degree among those within the target block is counted. Consequently, the characteristic quantity of color degrees for each pixel is evaluated using both the brightness signal V and the saturation signal W. A considerably low threshold, such as Vx shown in FIG. 9, is set for the brightness signal V. A considerably high threshold, such as Wx shown in FIG. 10, is set for the saturation signal W. The number of pixels which have brightness signals V lower than the threshold Vx and saturation signals W higher than the threshold Wx is counted.

Alternatively, the evaluation may be made by setting an appropriate threshold for a linear combination value by appropriate coefficients for brightness and saturation. It is also possible to use only the saturation signals W without using the brightness signals V.

(S9)

In step S9, the number of pixels Cx is compared with a predetermined number Cm which has been set in advance. If the number of pixels Cx is equal to or more than the predetermined number Cm (Yes in the Step S9), then processing goes on to S21 in FIG. 7, in which the image is instantly determined as a color image. This is because the target block includes many pixels having particularly high color degrees. In this case, determination of the remaining blocks is omitted.

(S10)

If the number of pixels Cx is below the predetermined number Cm (No in step S9), the number Cy of pixels recognized as color pixels within the target block is counted. The pixels counted here are not only those having particularly high color degrees counted in the step S8. They are all of the pixels that are not monochrome pixels. The number of pixels Cy is, therefore, larger than the number of pixels Cx. In counting, the same characteristic quantities may be used as in the step S8.

That is to say, evaluation is made by using both the brightness signals V and the saturation signals W. A value, such as Vy between Vx and VT shown in FIG. 9, is set as a threshold for brightness signals V. A value, such as WY lower than Wx shown in FIG. 10, is set as a threshold for saturation signals W. Then, the number of pixels having brightness signals V lower than the threshold Vy and saturation signals W higher than the threshold Wy is counted. Alternatively, evaluation may be made by setting an appropriate threshold for a linear combination value by appropriate coefficients for brightness and saturation. It is also possible to use only the saturation signals W without using the brightness signals V.

The values Vy and Wy can be adjusted by selecting the characteristic quantity preference button 29 on the screen shown in FIG. 5 on the operation and display panel 18. The value Vy cannot be set higher than VT in FIG. 9.

It is noted that the brightness threshold Vy and the saturation threshold Wy are not necessarily uniform for all of the pixels in an image. If pixels belong to blocks farther from the center of the image, their brightness thresholds Vy become lower and saturation thresholds WY become higher. This is intended to conform with a case where even a monochrome pixel includes some colors due to, for example, the chromatic aberration of the optical system and has lower brightness and higher saturation on the peripheral portion of the image.

Figure 11:
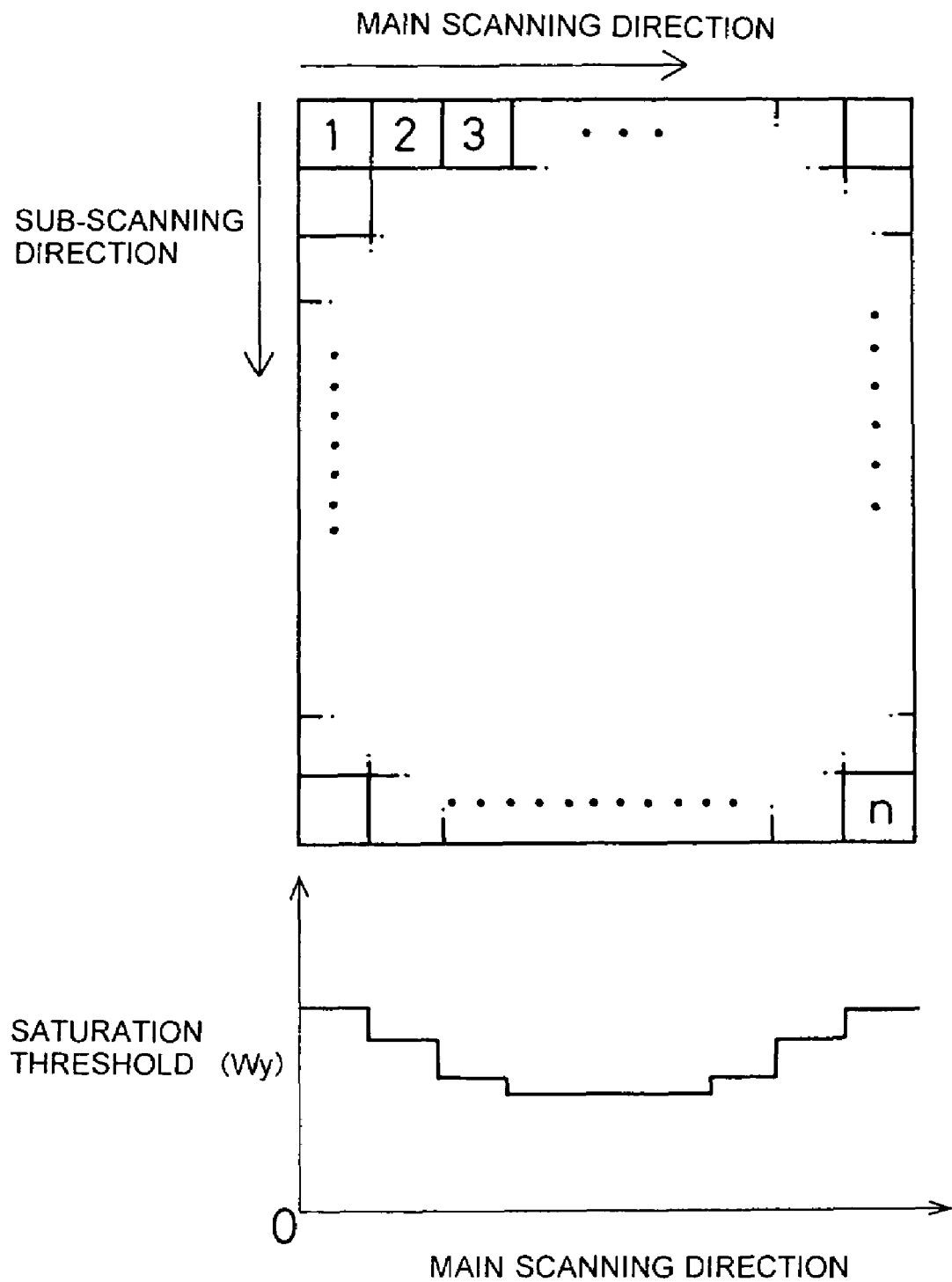
FIG. 11 is an explanatory view for a case where a saturation threshold is determined in accordance with the position of a block in the image.
Figure 12:
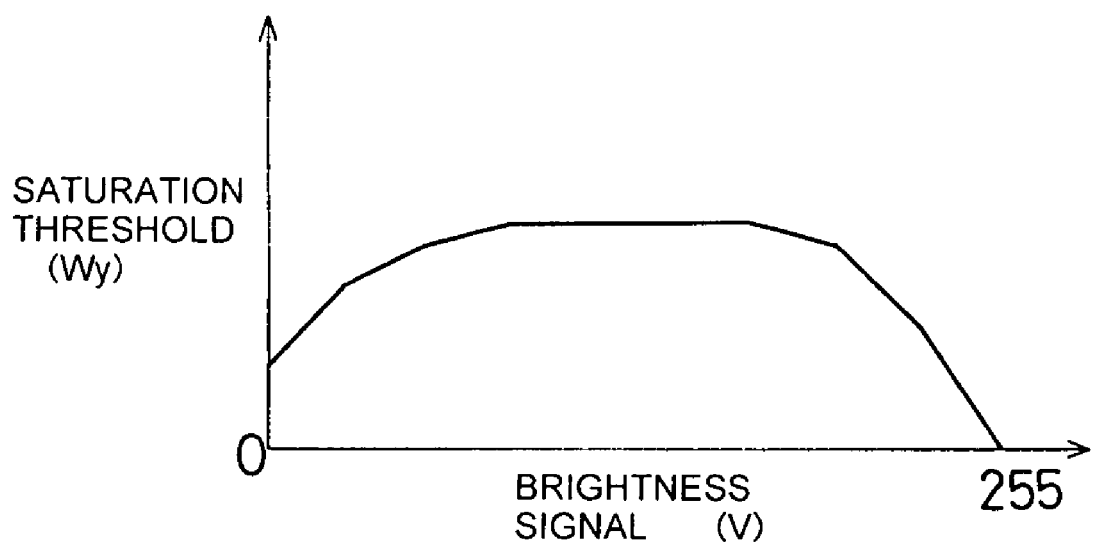
FIG. 12 is an explanatory view for a case where a saturation threshold is determined in accordance with brightness signal.

FIG. 11 shows an example for setting a saturation threshold Wy in accordance with the position of a block. In this example, as blocks are farther from the center of the image in main scanning direction, their saturation thresholds Wy are higher. While a table univocally set for brightness signals V is prepared for saturation thresholds Wy, a threshold may be read from the table in accordance with the brightness signal V obtained for a certain pixel by the second provisional scanning. In case of adjusting values Vy and Wy using the operation and display panel 18, they are moved up and down in parallel with each other while keeping the dimensional relationship of the blocks positioned within the image and the like.

(S11)

In step S11, the number of pixels Cy recognized as color pixels is divided by the total number of pixels in the target block, to thereby obtain a color pixel ratio Cyr.

(S12; FIG. 7)

In step S12, the color pixel ratio Cyr is compared with a predetermined preference threshold Cpr. If the color pixel ratio Cyr is equal to or higher than the preference threshold Cpr (Yes in the step S12), processing goes on to step S21, in which the image is instantly determined as a color image. This is because the color pixel ratio Cyr of the target block is particularly high. In this case, the determination of the remaining blocks is omitted.

(S13)

If the color pixel ratio Cyr is below the preference threshold Cpr (No in step S12), then the color pixel ratio Cyr is compared with a normal threshold Ctr lower than the preference threshold Cpr. The value of the threshold Ctr can be adjusted by selecting the density preference button 28 on the screen in FIG. 5 using the operation and display panel 18. The threshold Ctr cannot be set higher than the preference threshold Cpr.

(S14)

If the color pixel ratio Cyr is equal to or higher than the threshold Ctr (Yes in the step S13), then the target block is determined as a color block. This is because the color pixel ratio Cyr of the target block is somewhat high.

(S15)

Figure 8:
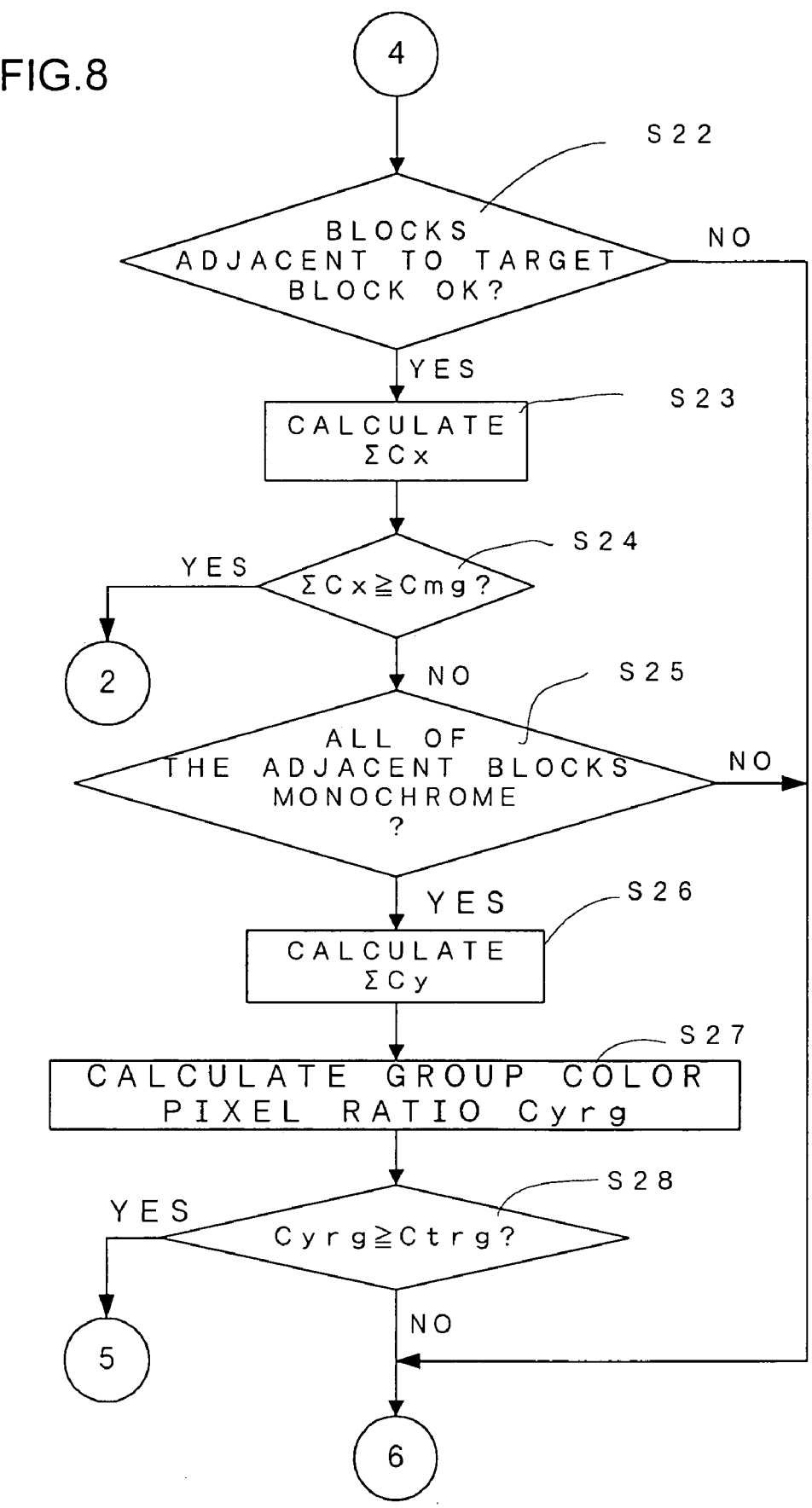
FIG. 8 is a flow chart (3) of color determination processing.

As a result, the variable Nb is incremented by one. If the color pixel ratio Cyr is less than the threshold Ctr in the step 13 (No), then group processing which will be described later with reference to FIG. 8 is conducted.

It is noted that the threshold Ctr of the color pixel ratio Cyr is not always the same for all of the blocks within the image. If the blocks are farther from the center of the image, their thresholds Ctr become higher. This is intended to correct the erroneous determination of a monochrome pixel as a color pixel due to, for example, the chromatic aberration of the optical system on the peripheral portion of the image. If the threshold Ctr is adjusted using the operation and display panel 18, it is moved up and down while keeping the dimensional relationship of the blocks positioned within the image.

(S16)

In step S16, the value Nb is divided by the total number of blocks of the image, to thereby obtain a temporary color block ratio Czr.

(S17)

In step S17, the temporary color block ratio Czr is compared with the threshold Cqr. The threshold Cqr can be adjusted by selecting the area preference button 27 on the screen shown in FIG. 5 using the operation and display panel 18. If the temporary color block ratio Czr is equal to or higher than the threshold value Cqr (Yes in the step S17), processing goes on to step S21, in which the image is instantly determined as a color image. This is because the number of color blocks Nb reaches the number required to determine that the image is a color block at this moment. In this case, determination of the remaining blocks is omitted.

(S18)

If the temporary color block ratio Czr is less than the threshold Cqr (No in the step S17), it is determined whether all blocks of the image have been subjected to determination in step S18.

(S19)

Figure 6:
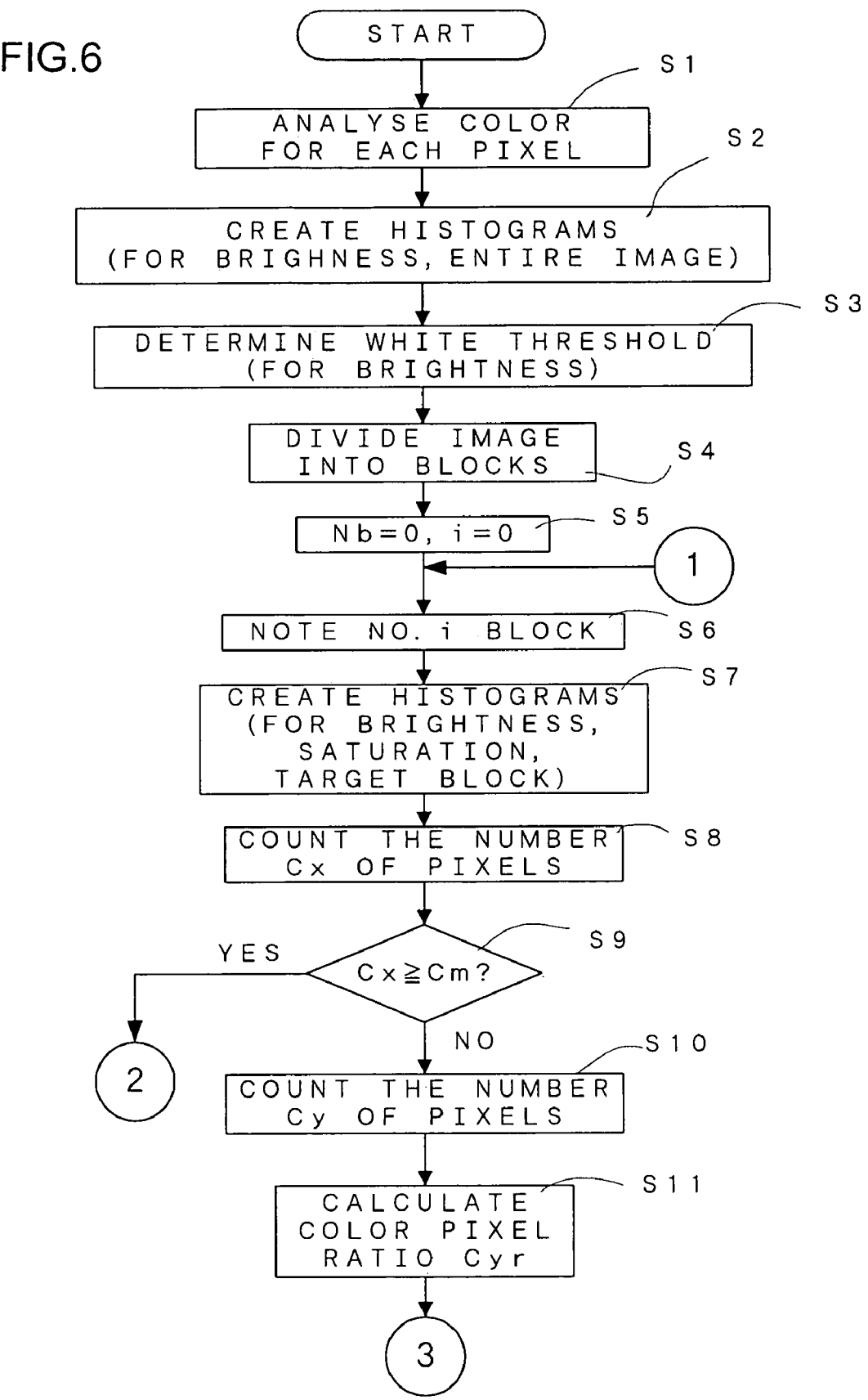
FIG. 6 is a flow chart (1) of color determination processing.

If all of them have not been subjected to determination (No in the step S18), the variable "i" is incremented by one and processing returns to the step S6 in FIG. 6. The target block is changed to the next block and same determination processing is pursued for the new target block. The numbers of color pixels Cx and Cy obtained for the previous target block, as well as the block number and the determination result as to whether the block is a monochrome or color block, are stored.

(S20)

If it is judged that all blocks have been subjected to determination in the step S18 (Yes), it is determined that the image is a monochrome image. Consequently, a monochrome signal is generated from the color signal generating unit 15 in the image processing apparatus 205 and fed to the image forming unit 300. As a result, the image forming unit 300 is set in a monochrome mode. In other words, the relief roller 305 is moved to thereby hold the paper carrying belt 304 in contact with only the black imaging unit 302K. In addition, a laser beam from the laser oscillator 314 is inputted only into the imaging unit 302K. In this state, a monochrome copy is made for the image on the original.

(S21)

If it is judged Yes in the steps S9, S12, S17 and S24 in FIG. 8 which will be described later, then it is determined that the image is a color image. As a result, a color signal is generated from the color signal generating unit 15 in the image processing apparatus 205 and fed to the image forming unit 300. Thus, the image forming unit 300 is set in a color mode. In other words, the relief roller 305 is moved to hold the paper carrying belt 304 in contact with all of the imaging units 302C, 302M, 302Y and 302K. In addition, a laser beam from the laser oscillator 314 is inputted into all of the imaging units 302C, 302M, 302Y and 302K. In this state, a color copy is made for the image on the original.

(S22; FIG. 8)

In the color pixel ratio Cyr is less than the threshold Ctr in the step S13 (No), it is judged whether or not the target block can be subjected to the determination for a group including the target block and blocks adjacent to the target block. Group processing is one in which a group of blocks consisting of four blocks, i.e., the target block "i", a block (i-k) prior to the target block "i" by one row, a block (i-1) prior to the target block "i" by one column and a block (i-k-1) prior to the block "i" by one row and one column is considered and, a color portion 36, if extending over the blocks, is relieved.

The three adjacent blocks (i-k), (i-1) and (i-k-1) have smaller block numbers than that of the target block and they have been already subjected to single block determination. However, it is yet to be determined whether or not the image is a color image (Yes in the steps S9, S12, S17 or S24 which will be described later). Symbol "k" used herein indicates the number of blocks per row in the image.

Figure 14:
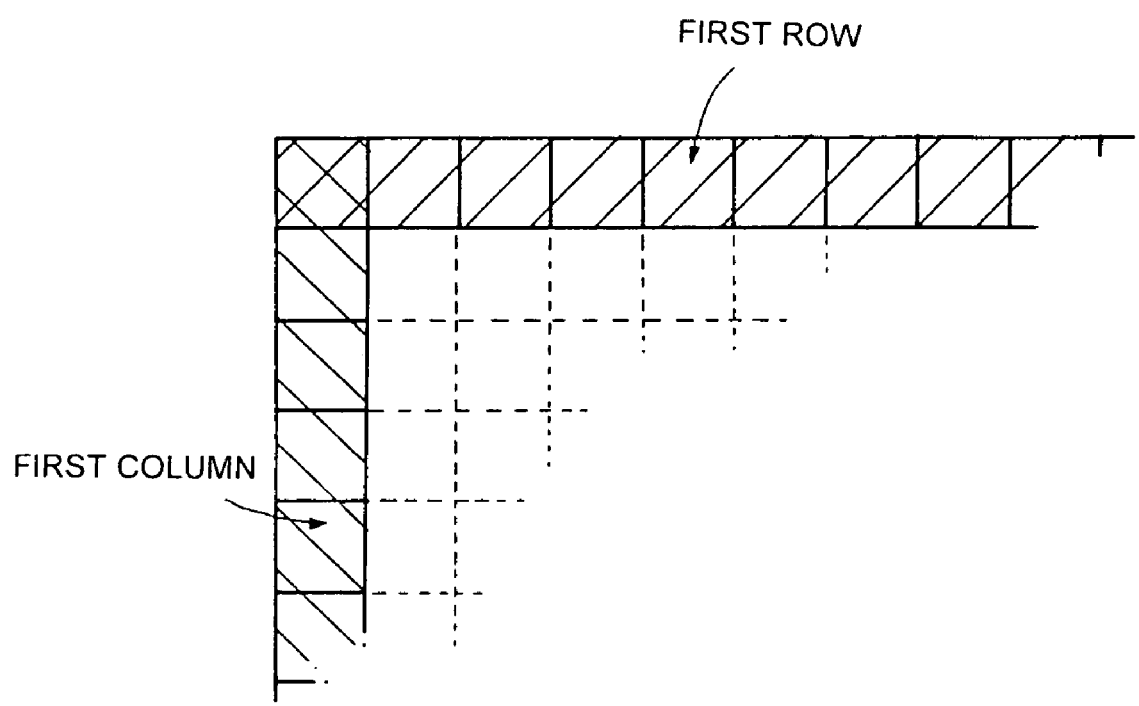
FIG. 14 shows a block which is not subjected to block group processing.

In these steps, if the target block is in the first row or first column of the image, as shown in FIG. 14, it is judged No. This is because part of or all of the adjacent blocks are missing. If so, group processing cannot be conducted and processing goes on to the step S18 in FIG. 7 without going through group processing. As for the other cases, all of the three adjacent blocks exist and it is, therefore, judged Yes.

(S23)

In step S23, the numbers of pixels Cx in the four blocks belonging to the block group (or the number of pixels having particularly high color degrees) are summed up.

(S24)

In step S24, the sum ΣCx is compared with a predetermined number Cmg which has been set in advance (and which may be the same as the predetermined number Cm in the step S9). If the sum ΣCx is equal to or larger than the predetermined number Cmg (Yes in the step S24), processing goes on to the step S21 in FIG. 7, in which the image is instantly determined as a color image. This is because the block group includes a number of pixels having particularly high color degrees. In this case, the determination of the remaining blocks is omitted.

(S25)

If the sum ΣCx is below the predetermined number Cmg (No in the step S24), it is judged whether or not all of the three adjacent blocks (i-k), (i-1) and (i-k-1) are monochrome blocks. If at least one of them is determined as a color block, it is judged No and processing goes on to the step S18 in FIG. 7 without going through group processing. This is intended to prevent doubly counting a color block due to the existence of such a block.

(S26)

If all of the three adjacent blocks are monochrome blocks (Yes in the step S25), the numbers Cy of pixels of the four blocks belonging to the block group (or the number of pixels recognized as color pixels) are summed up.

(S27)

Thereafter, the sum ΣCy is divided by the total number of pixels in the block group, to thereby obtain a group color pixel ratio Cyrg in step S27.

(S28)

In step S28, the group color pixel ratio Cyrg is compared with a threshold Ctrg lower than the threshold Ctr in the step S13. If the group color pixel ratio Cyrg is equal to or higher than the threshold Ctrg (yes in the step S28), processing goes on to the step S14 in FIG. 7, in which the target block is determined as a color block. Although the color pixel ratio of the target block is not so high, color pixels are present to some extent for the block group including the target block and the adjacent blocks. If the group color pixel ratio Cyrg is below the threshold Ctrg, processing goes on to the step S18 in FIG. 7.

The threshold Ctrg of group color pixel ratios is a quarter of the average of the respective thresholds Ctr (step S13) for the four blocks belonging to the block group. If the thresholds are adjusted on the operation and display panel 18, the threshold Ctrg is adjusted accordingly.

This is the flow of the processing procedures for color determination. In this flow, if the image data of an original is fetched by provisional scanning, determination starts with the block of number 0 in ascending order. In other words, color determination is basically made in units of blocks using the color pixel ratios Cyr of the respective blocks (in the step S13). Every time a block is determined as a color block, the number of color blocks Nb is counted and the temporary color block ratio Czr is calculated (in the steps S14 to S16).

If the temporary color block ratio Czr reaches the threshold Cqr, it is determined that the image is a color image (Yes in the step S17, the step S21). If the temporary color block ratio Czr does not reach the threshold Cqr after all of the blocks have been subjected to determination process (i.e., the temporary color block ratio Czr in this case is a color block ratio), the image is determined as a monochrome image (Yes in the step S18, the step S20).

In addition, even if a certain block is not determined as a color block per se, it is determined as a color block as long as the number of color pixels ΣCy of a block group including the certain block and its adjacent blocks reaches a certain level (Yes in the step S28). Furthermore, if a block or block group has pixels having particularly high color degrees to some extent, then the image is determined as a color image without making determination of the remaining blocks (Yes in the step S9 or S24, S21). If a block has particularly many color pixels, the image is determined as a color image without making determination of the remaining blocks (Yes in the step S12, S21).

As described so far, in the image processing apparatus 205 in the color copying machine 1 for the embodiment according to the present invention, an image is divided into a number of blocks and determination is made for each block while an original is provisionally scanned to determine whether the image is a monochrome image or a color image. By so doing, even if an image partly includes color regions and the remaining regions of the image are monochrome, it is possible to obtain a significant color pixel ratio for a block to which the color regions belong. As a result, it hardly happens that an original including a locally color region, such as a signature, a stamp and an underline, is erroneously determined as a monochrome image without giving consideration to the color region.

Moreover, according to the present invention, not only each block is determined per se but also a block group including the block and its adjacent blocks is subjected to determination. Thus, even if a local color region spreads over a plurality of blocks and none of the blocks are not determined as color blocks, it is possible to conduct accurate color determination without ignoring the color region.

Further, if a block includes pixels having particularly high color degrees in certain number, a block has a particularly high color pixel ratio or the like, the image is determined as a color image irrespectively of the remaining blocks. Due to this, it is possible to instantly complete determination if there exists a region having a locally strong hue and to, thereby, promptly start copying operation in a color mode.

In addition, various thresholds for use in the determination of pixels and blocks are not uniform within the image. The farther the pixels or the blocks are distant from the center of the image, the less frequently they are determined as color ones. This makes it possible to prevent a monochrome signal from being erroneously determined as a color image due to chromatic aberration on the peripheral portions of the image.

Besides, it is possible to show up an adjustment screen shown in FIG. 5 on the operation and display panel 18. Thanks to this, it is possible to adjust various thresholds by an operator's operation and to make settings to allow accurate color determination.

It is noted that the embodiment is given only for illustrative purposes and should not be interpreted to limit the scope of the present invention. The present invention can be variously improved and changed within the scope not departing from the subject matter thereof.

For instance, in the aforementioned embodiment, if color determination is made to a target block (in the steps S12 and S13 in FIG. 7), a color pixel ratio Cyr obtained by dividing the number of color pixels Cy within the target block by the total pixel number, is compared with the thresholds Cpr and Ctr. Since the total number of pixels is known, comparison of the number of pixels Cy with corresponding thresholds is substantially the same and suffices. The same thing is true for color determination for block groups (in the step S28 in FIG. 8) and that for the image using the temporary color block ratio Czr (in the step S17 in FIG. 7).

Besides, the number of divisions (the number of rows and columns) for dividing an image into a plurality of blocks and the number of pixels within a block may be freely chosen. The number of blocks (the number of rows and columns) which belong to a group subjected to block group analysis may be freely chosen.

[Second Embodiment]

Aspects of the second embodiment are mostly common to those of the first embodiment and several modifications are added to the second embodiment. Therefore, as to aspects common to the first embodiment, detailed description of the first embodiment will be referred. Accordingly, modified aspects Will be mainly described hereinafter.

The second embodiment differs from the first embodiment in two points as follows. First, different from the first embodiment, the three primary colors are not dealt with equally for color/monochrome determination. In the second embodiment, a specified color can be set to facilitate color/monochrome determination. The specified color is set to facilitate determining an image of a black letter-based original on which an underline and a stamp are put in red or such a specified color as a color image.

Second, different from the first embodiment, each block of an original (excluding blocks not subjected to determination) is not equally dealt. Instead, blocks on certain portions which are likely to cause a color image determination can be designated in advance. Since a signature, a stamp and the like are usually put on certain predetermined portions of a manuscript, designation of blocks on the certain portions including color pixels makes it easy to determine the manuscript as a color image.

Figure 15:
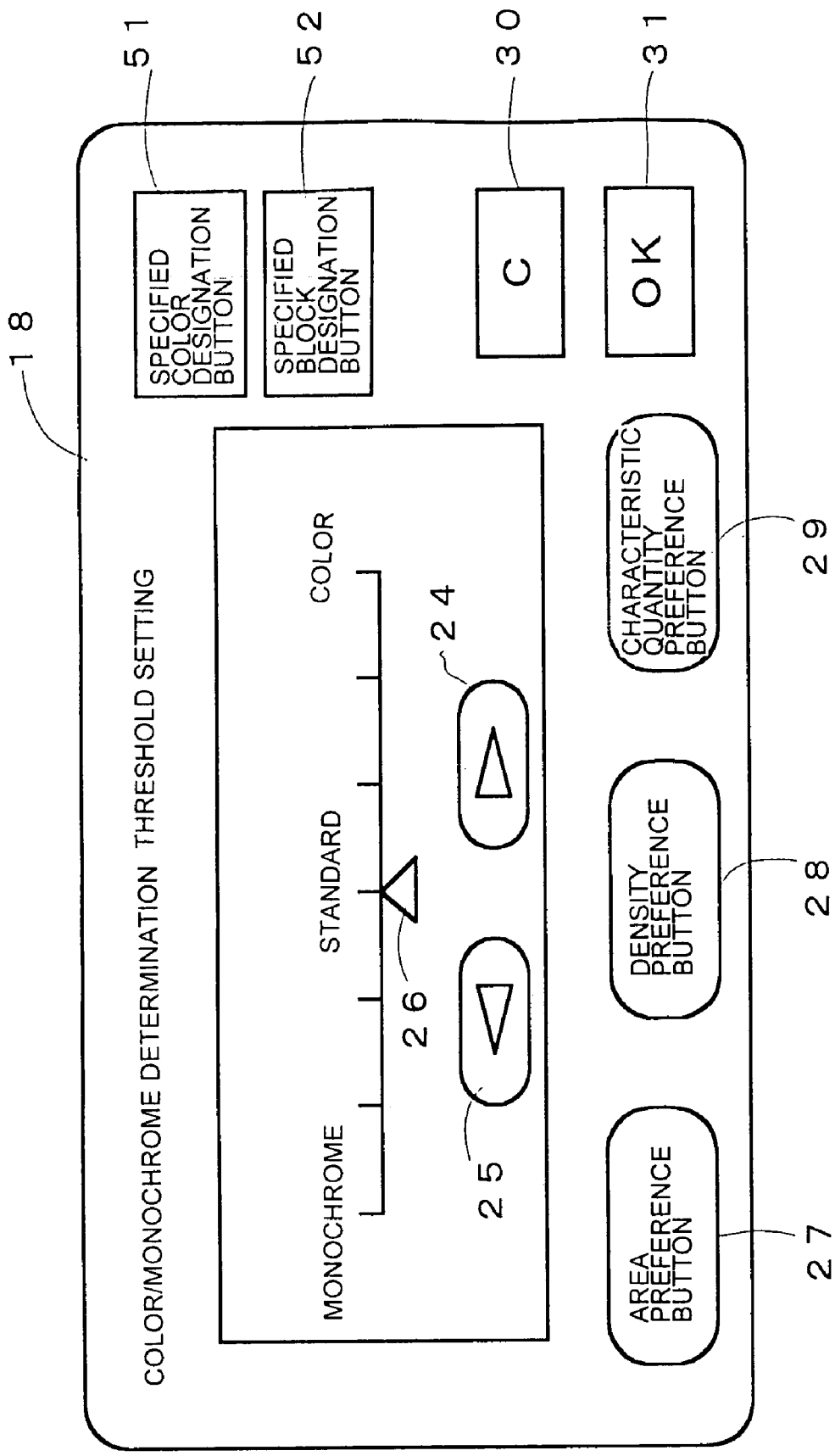
FIG. 15 shows a threshold setting screen on an operation and display panel according to the second embodiment.

Therefore, in the second embodiment, a specified color designation button 51 and a specified block designation button 52 are added for a threshold adjusting screen of the operation and display panel 18 (corresponding to the FIG. 5 for the first embodiment) as shown in FIG. 15.

Figure 16:
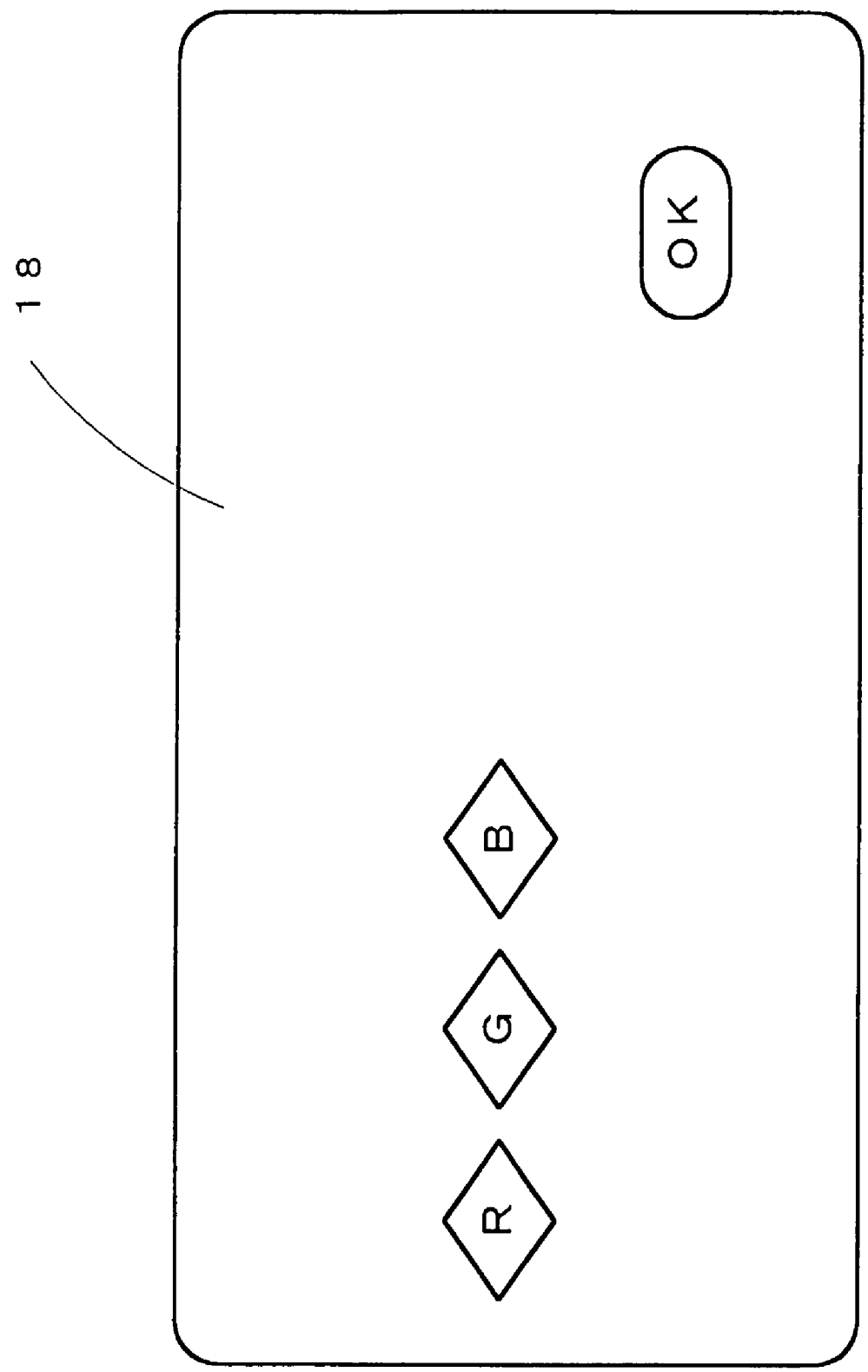
FIG. 16 shows a screen appearing after the specified color designation button is operated on the operation and display panel shown in FIG. 15.

When an operator touches the specified color designation button 51 on the screen shown in FIG. 15, the operation and display panel 18 will turn into a screen shown in FIG. 16. The screen displays a red-designation button(R), a green-designation button(G), and a blue-designation button(B) so that the operator can designate a specified color to facilitate color image determination. Other than these buttons, an OK button is also displayed.

When the operator touches one of the color designation buttons, a color corresponding to the touched button is designated as the color which tends to cause color image determination. When the operator touches the OK button, the screen of FIG. 16 returns to that of FIG. 15. The operator can change designation of specified colors any times by touching other color designation buttons until touching the OK button. In that case, a color corresponding to a button the operator last touched is the specified color. Specifically, the operator may designate such a specified color as often used for putting a signature, a date stamp, or an underline. The operator can select a mode to deal with respective colors equally without designating a specified color.

Figure 17:
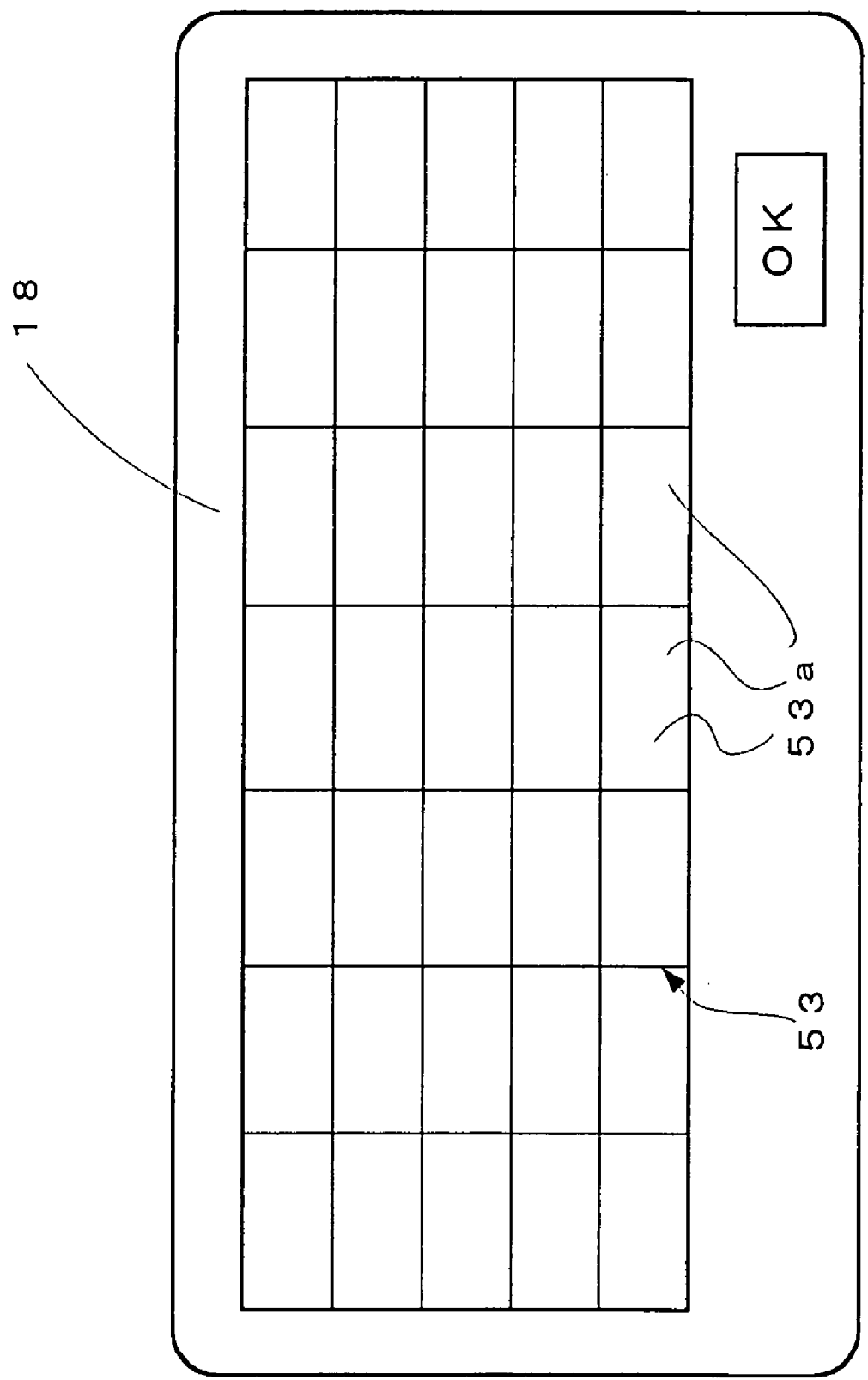
FIG. 17 shows a screen appearing after the specified block designation button is operated on the operation and display panel shown in FIG. 15.

When the operator touches the specified block designation button 52 on the screen shown in FIG. 15, the screen of the operation and display panel 18 turns into a screen shown in FIG. 17. Other than an OK button, the screen of FIG. 17 displays a group of buttons 53 which divide an original into a plurality of regions in length and width. Each of buttons 53a included in the group of buttons 53 is to designate a block mentioned in FIG. 3. The number of blocks to be designated by one of the button 53a is not necessarily one but a group of blocks adjacent to the designated block may be designated as a group.

When the operator touches one of the buttons 53a on the screen of FIG. 17, a block corresponding to the touched button 53a is designated as a block on a certain portion which tends to cause a color image determination. Further, by touching another button 53a additionally, the operator can designate more than two blocks on the certain portion corresponding to the pushed buttons 53a. When an already-designated-button 53a is touched again, designation of the block corresponding to the already-designated-button 53a is cancelled. When the operator touches the OK button, the screen of FIG. 17 returns to the screen of FIG. 15.

Figure 18:
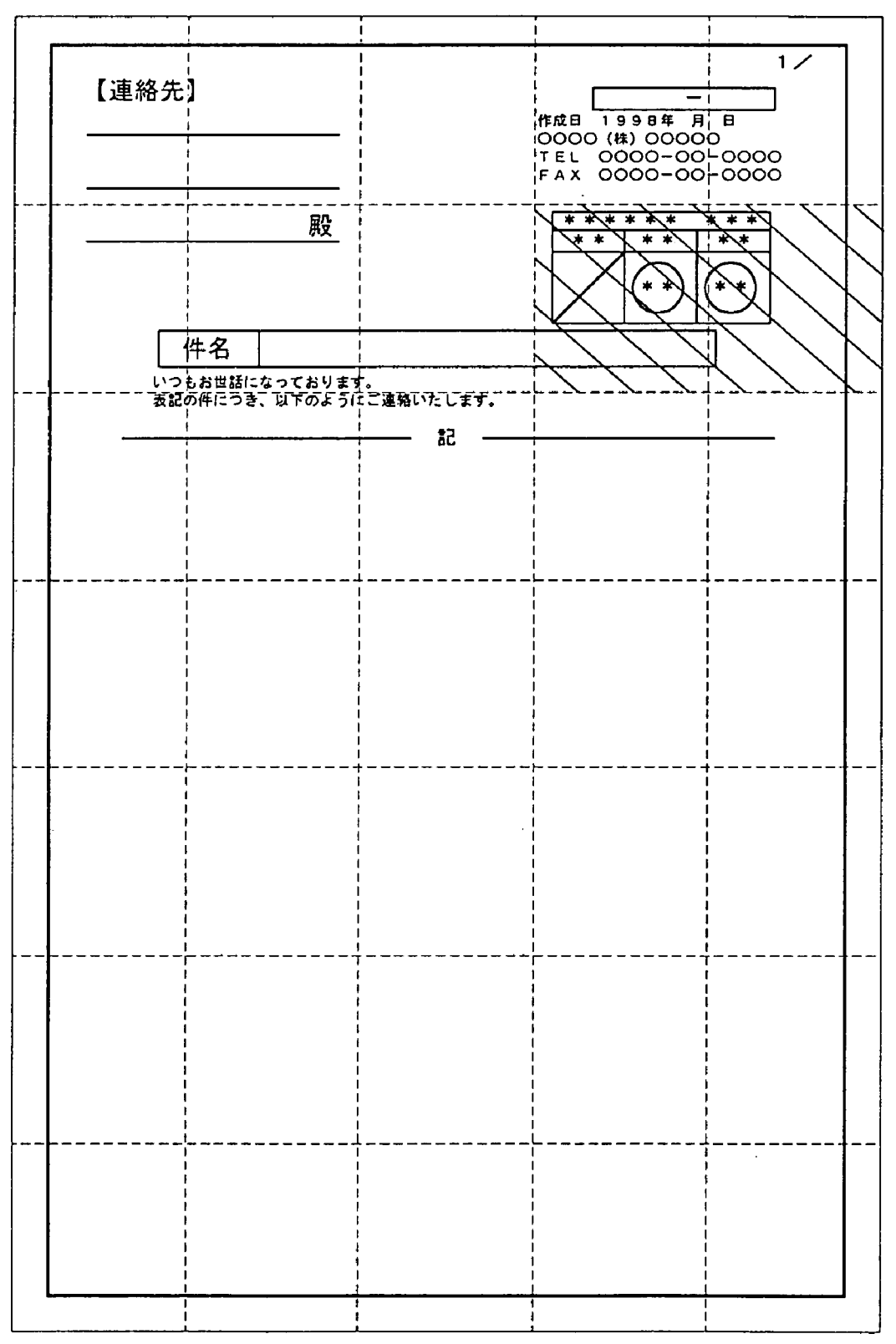

More specifically, as to a document in fixed form, the operator may designate blocks on a portion where a signature, a date stamp or the like are put. For example, as to a document in fixed form shown in FIG. 18, the operator may designate blocks corresponding to a hatching portion. Circle-like figures in square frames represent stamps. The operator can select a mode to deal with respective blocks equally without designating a specified block.

Similar to the first embodiment, in the second embodiment, provisional scanning is conducted prior to main scanning for taking a copy. The provisional scanning is conducted to determine whether an original is a color image or monochrome image. Based on data obtained by the provisional scanning, color/monochrome determination is conducted in a manner similar to the aspects of the first embodiment shown in FIGS. 6–8.

(S31)

Figure 7:
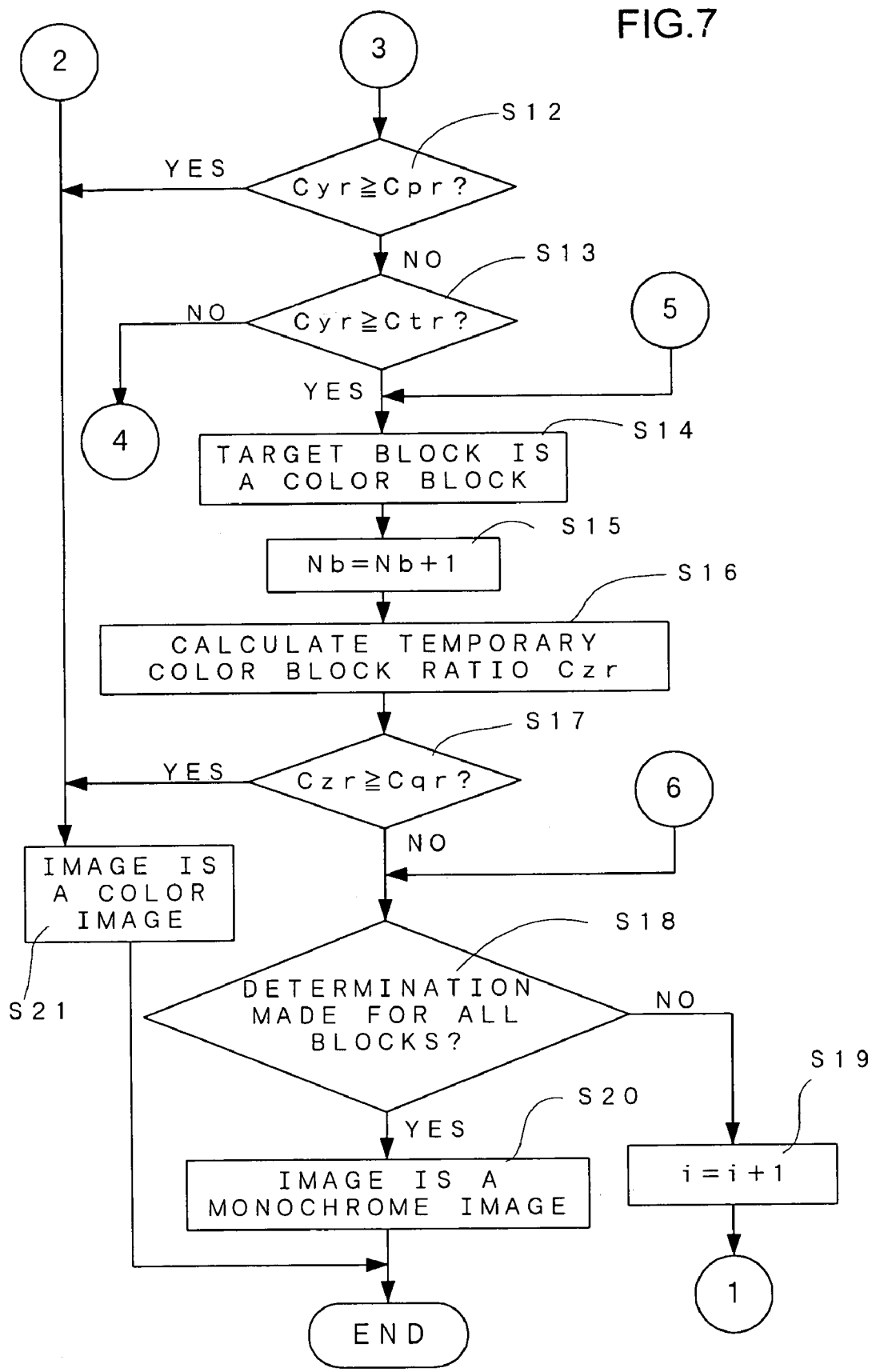
FIG. 7 is a flow chart (2) of color determination processing.
Figure 19:
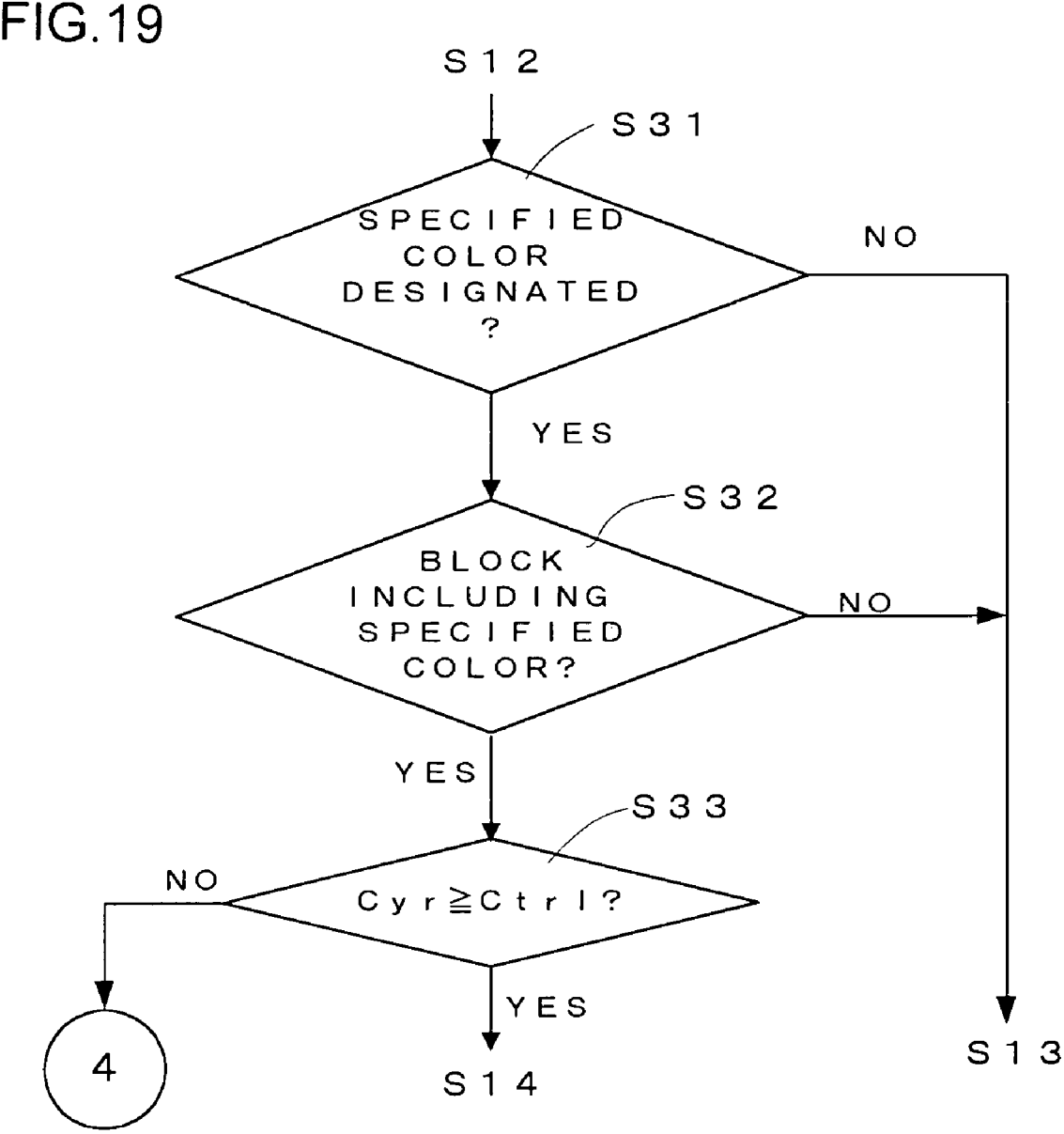
FIG. 19 is a flow chart showing processing for a specified color.

In order to deal with a specified color designated at the screen of FIG. 16, processing shown in FIG. 19 is conducted after Step S12 in FIG. 7. First, in step S31, it is determined whether or not a specified color is designated at the screen of FIG. 16. If a specified color is not designated (No in the step S31), processing goes on to S13. If a specified color is designated (Yes in the step S31), the processing goes on to S32. Suppose R(red) is designated as a specified color hereinafter.

(S32)

In step S32, it is determined whether or not a feature of R(red) as a specified color is stronger than features of other three primary colors 16 at a target block. This determination is made as follows. First, intensity histograms of respective color components, namely, R(red), G(green) and B(blue), are created for each pixel in the target block.

Figure 20:
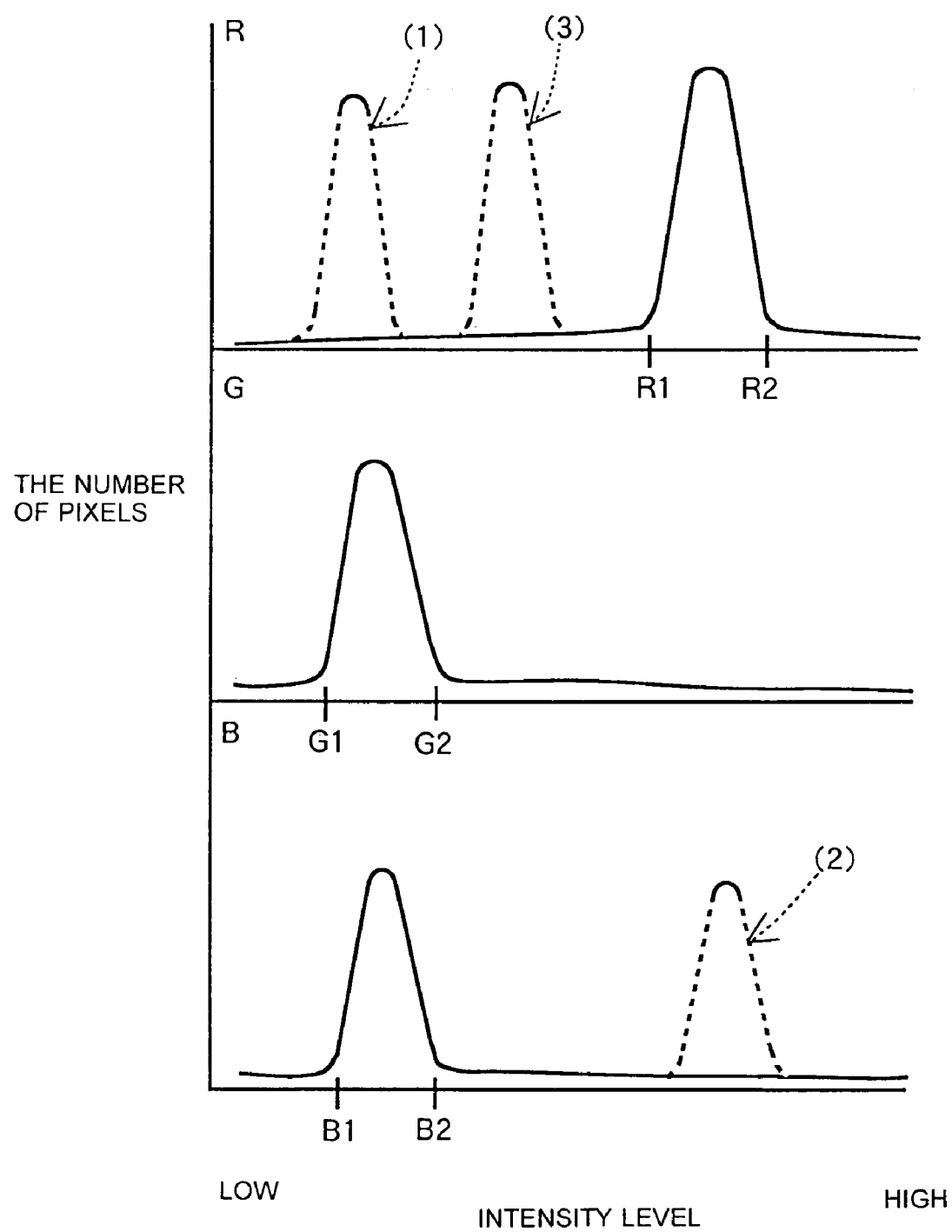
FIG. 20 is an example of a histogram created for each color component.

An example of a histogram created at this processing is shown in FIG. 20. The example indicated with solid lines represents histograms of a block for an image of black letter-based original partially including red underlines. As shown in FIG. 20, ranges are pre-set for histograms of respective color components. In this case, a set-range R1–R2 for red as a specified color is set at higher intensity level than set-ranges G1–G2 and B1–B2 for the other colors.

For the exemplified histograms indicated with solid lines in FIG. 20, distribution peaks of respective colors are within the set-ranges for respective colors. Thereby, in this case, the block is determined as a specified-color block. On the other hand, if an underline included in the block is blue which is not the specified color, its histograms for R(red) and B(blue) correspond to a broken lines (1) and (2) respectively. Since intensity distribution peaks of respective colors are out of ranges set for respective colors as such, the block including a blue underline is determined as a normal block, in other words, non-specified-color block.

Further, a case that a block to be processed partly includes a color picture will be considered herein. In this case, histograms for all of the three colors indicate high intensity level. Since intensity distributions of G and B are out of the set-ranges for respective colors, the block is determined as a normal block.

Still further, a case that a block to be processed is a black letter-based original with a red portion on the back side of the original seen through in the original side will be considered herein. In this case, histogram for R corresponds to a broken line (3) and histograms for G and B correspond to solid lines indicated in FIG. 20. Since intensity distribution for R is out of its set-range, the block is determined as a normal block.

(S33)

In step S33, if a target block is a specified-color block (Yes in the step S32), color pixel ratio Cyr of the block is compared with a threshold Ctrl which is still lower than a normal threshold. If the color pixel ratio Cyr is higher than the threshold Ctrl (Yes in the step S33), the processing goes on to step S14 in FIG. 7 and the target block is determined as a color block. If the color pixel ratio Cyr is lower than the threshold Ctrl (No in the step S33), the processing goes on to the processing shown in FIG. 8.

The threshold Ctrl used in S33 is still lower than a normal threshold Ctr. Therefore, a color block having a not so high color pixel ratio is determined as a color block in step S33. Thereby, the above-mentioned block for a black letter-based image on which a red underline is drawn easily determined as a color block.

Figure 13:
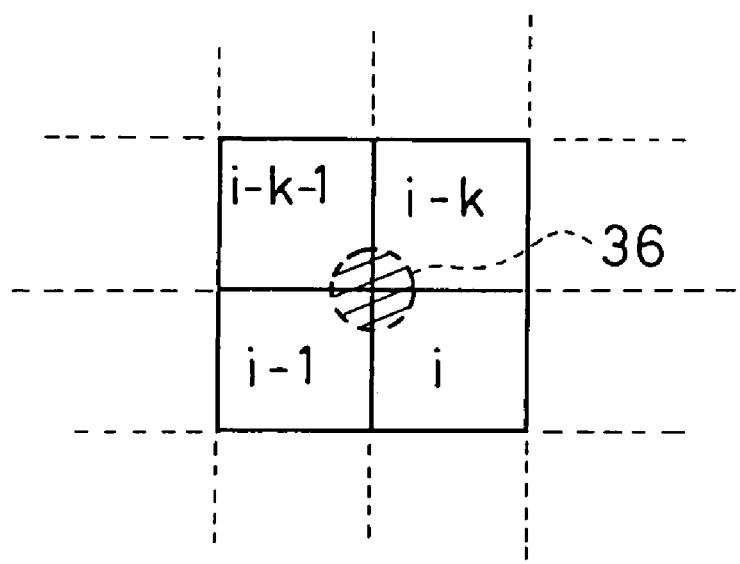
FIG. 13 shows block group processing.

If the target block is not a specified-color block (No in the step S32), processing goes on to S13 in FIG. 13 and processing similar to the aspects of the first embodiment is conducted. Specifically, color/monochrome determination of images such as a black letter-based image on which a blue underline is drawn, an image partially including a color picture, a black letter-based image with a red portion on the back side of the original slightly seen through in the original side and the like are made by the threshold Ctr which is higher than the threshold Ctrl at S33. Accordingly, blocks of such images are determined as monochrome images as long as their color pixel ratio Cyr is not considerably high.

Designation of a specified color at the screen of FIG. 16 means nothing but choice of a color for which range of high intensity level is set in a histogram of FIG. 20. Therefore, a high level range such as R1–R2 for R in FIG. 20 is set for the color chosen. Low-level ranges such as G1–G2 for G, and B1–B2 for B in FIG. 20 are set for other colors. Specified-color block determination is made based on the ranges set for respective colors.

(S34)

Figure 21:
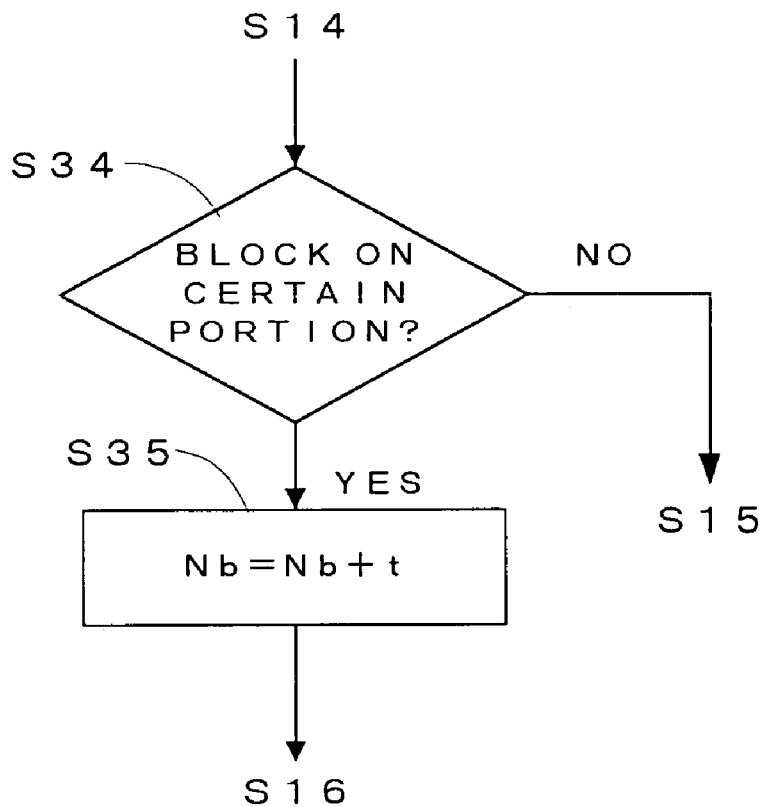
FIG. 21 is a flow chart showing processing for a specified block.

In order to deal with the block on the certain portion designated at the screen of FIG. 17, processing shown in FIG. 21 is conducted after Step S14 (the target block is regarded as a color block). In step S34, it is determined whether or not the target block is a block on the certain portion designated at the screen of FIG. 17, at first. If the target block is not the block on the certain portion (No in the Step S34), processing goes on to S15 in FIG. 7 and "1" is added to a variable Nb.

(S35)

If the target block is the block on the certain portion, (Yes in the Step S34), "t" is added to the variable Nb. "t" is a predetermined value and larger than "1". That is, a block on a certain portion is evaluated heavier than a normal block for calculation of a color block ratio to an entire image. Thereby, in case the block on the certain portion is a color block, the image for the color block tends to be determined as a color image.

Figure 22:
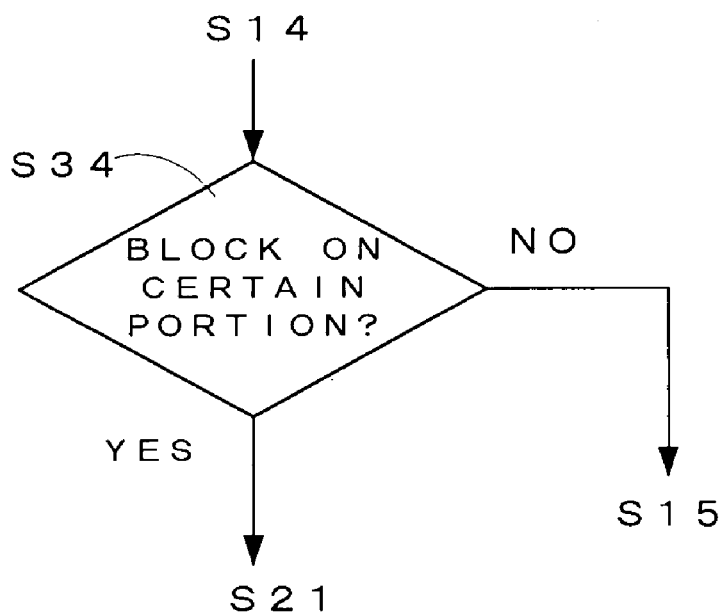
FIG. 22 is a flow chart showing processing for a specified block.

As shown in FIG. 22, if the target block is the block on the certain portion (Yes in the Step S34), processing may go on to S21 in FIG. 7 immediately. In this case, if at least one of the blocks on the certain portion designated at the screen of FIG. 17 is determined as a color block, an image for the block is determined as a color image at this point. Therefore, in case the block on the certain portion is a color block, the image for the block is surely determined as a color image. In that case, color block determination of remaining blocks is not required.

As stated above, according to the aspects of the second embodiment, a normal threshold Ctr and a threshold Ctrl which is lower than a Ctr are provided as two standard thresholds so as to determine whether a block is a monochrome block or a color block based on color pixel ratio Cyr. If a target block is a specified-color block having a feature closer to the specified color, threshold Ctrl as lower standard is used and if the target block is not the specified-color block, threshold Ctr as normal standard is used for color image determination. Thereby, a block having a feature closer to a specified color is determined as a color block even though its color pixel ratio Cyr is not so high. On the other hand, a normal block is prevented from being determined as a color block due to tiny color portions.

Specified color block determination is made by setting ranges for respective colors in intensity histograms, as described in FIG. 20. Therefore, only a black letter-based original or the like on which underlines and stamps put in a specified color, which an operator can possibly recognize as a color image, is subjected to processing for color block determination. Thereby, a block is prevented from being easily determined as a color block due to non-specified-color tiny portions.

Further, if a block on a certain portion can be designated and the designated block is a color block, the entire image for the blocks tends to be determined as a color image. Thereby, a portion on which is likely to be put a color, for example, a box portion to be stamped on for a document in fixed form is evaluated heavier for color image determination. Therefore, an original on which a color stamp or the like in stamped in a certain portion can surely be determined as a color image. On the other hand, an image is prevented from being determined as a color at post determination due to tiny color smudges on portions other than the certain portion.

The present invention can be variously improved and changed within the scope not departing from the subject matter thereof. For example, the processing of a specified color described in FIG. 19 may be applied to color determination of a group of blocks (S28 in FIG. 8).

What is claimed is:

1. An image processing apparatus including:
   a brightness data extracting section for extracting brightness data from image information of each pixel;
   means for determining a reference value based on extracted brightness data;
   a first determination means for determining whether or not a pixel included in an image is a color pixel by using the reference value;
   means for dividing the image into a predetermined number of a plurality of blocks;
   counting means for counting the number of color pixels for each block; and
   second determination means for determining whether or not the image is a color image based on the counting result by the counting means, wherein
   the second determination means determines whether or not an image is a color image even if the numbers of color pixels for blocks are not completely counted, and the counting means for counting the number of color pixels for each block stops counting operation after the second determination means completes color image determination.

2. An image processing apparatus of claim 1 further including third determination means for determining whether or not said each block is a color block, respectively, based on the number of color pixels for each block, wherein the second determination means determines whether or not the image is a color image based on the determination result by the third determination means.

3. An image processing apparatus of claim 2, wherein the third determination means determines a block as a color block in case the number of color pixels within a block exceeds a first threshold.

4. An image processing apparatus of claim 2, wherein the second determination means determines an image as a color image in case the number of color blocks included in the image exceeds a first threshold.

5. An image processing apparatus of claim 1, wherein the second determination means determines an image as a color image in case a block having color pixels which exceeds a first threshold in number is discovered.

6. An image processing apparatus of claim 1, wherein the second determination means excludes a block on a certain portion from the determination.

7. An image processing apparatus of claim 6, wherein the certain portion includes peripheral portions of an image.

* * * * *

UNITED STATES PATENT AND TRADEMARK OFFICE
CERTIFICATE OF CORRECTION

PATENT NO. : 7,072,506 B1 Page 1 of 1
APPLICATION NO. : 09/263805
DATED : July 4, 2006
INVENTOR(S) : Y. Hirota et al.

It is certified that error appears in the above-identified patent and that said Letters Patent is hereby corrected as shown below:

On the Title Page of the Letters Patent,

Under section "(76) Inventors", change ALL the inventors addresses from "c/o Minolta Co., Ltd., Osaka Kokusai Building., 3-13, 2-Chome, Azuchi-Machi, Chuo-Ku, Osaka-Shi, Osaka (JP) " to --Aichi-Ken, (JP) --

Under section "(76) Inventors", insert -- (73) Assignee: Minolta Co., Ltd, Osaka, JP --

Signed and Sealed this

Tenth Day of April, 2007

JON W. DUDAS
*Director of the United States Patent and Trademark Office*